US012739852B2

(12) United States Patent
Lee et al.

(10) Patent No.: US 12,739,852 B2
(45) Date of Patent: Sep. 15, 2026

(54) METHOD FOR HANDLING A MULTI-CELL SCHEDULING AND USER EQUIPMENT

(71) Applicant: Acer Incorporated, New Taipei City (TW)

(72) Inventors: Chien-Min Lee, New Taipei City (TW); Li-Chung Lo, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 342 days.

(21) Appl. No.: 18/469,559

(22) Filed: Sep. 19, 2023

(65) Prior Publication Data

US 2024/0114523 A1 Apr. 4, 2024

Related U.S. Application Data

(60) Provisional application No. 63/411,130, filed on Sep. 29, 2022.

(51) Int. Cl.
*H04W 72/232* (2023.01)
*H04L 5/00* (2006.01)
*H04W 72/12* (2023.01)

(52) U.S. Cl.
CPC ......... *H04W 72/232* (2023.01); *H04L 5/0048* (2013.01); *H04W 72/12* (2013.01)

(58) Field of Classification Search
None
See application file for complete search history.

(56) References Cited

U.S. PATENT DOCUMENTS

2022/0007208 A1* 1/2022 Zhou .................... H04B 7/0626
2022/0053522 A1* 2/2022 MolavianJazi ... H04W 72/0453
2023/0076139 A1* 3/2023 Muruganathan ...... H04W 16/28
2023/0217458 A1* 7/2023 Bang ..................... H04W 48/12 370/329
2023/0327742 A1* 10/2023 Matsumura ........... H04W 72/04 370/329

(Continued)

FOREIGN PATENT DOCUMENTS

WO 2021187966 9/2021
WO 2021196064 10/2021

(Continued)

OTHER PUBLICATIONS

R1-220XXX (Feature lead summary #1 on multi-cell PUSCH/PDSCH scheduling with a single DCI, Toulouse, France, Aug. 22-26, 2022), (Year: 2022).*

(Continued)

*Primary Examiner* — Maharishi V Khirodhar
(74) *Attorney, Agent, or Firm* — JCIPRNET

(57) ABSTRACT

A method for handling a multi-cell scheduling and a user equipment is provided. In the method, downlink control information (DCI) from a first serving cell is received. A first number of multiple scheduled cells according to the DCI is determined. The DCI is configured to schedule at least one communication on the scheduled cells. The communication is performed on at least one of the first number of the scheduled cells according to the DCI. The DCI includes at least one single DCI field, at least one separate DCI field and at least one configurable DCI field.

53 Claims, 24 Drawing Sheets

(56) References Cited

U.S. PATENT DOCUMENTS

| | | | | |
|---|---|---|---|---|
| 2024/0049244 | A1* | 2/2024 | Takeda | H04W 72/23 |
| 2025/0175840 | A1* | 5/2025 | Jiang | H04L 5/0057 |

FOREIGN PATENT DOCUMENTS

| | | |
|---|---|---|
| WO | 2022047348 | 3/2022 |
| WO | 2022086888 | 4/2022 |

OTHER PUBLICATIONS

Huawei et al., "Discussion on multi-cell scheduling with a single DCI", 3GPP TSG-RAN WG1 Meeting #110 R1-2205862, Aug. 22-26, 2022, pp. 1-19.

Spreadtrum Communications, "Discussion on multi-cell PUSCH/PDSCH scheduling with a single DCI", 3GPP TSG RAN WG1 #110 R1-2207695, Aug. 22-26, 2022, pp. 1-27.

Apple Inc., "On multi-cell PUSCH/PDSCH scheduling with a single DCI", 3GPP TSG RAN WG1 #110 R1-2207349, Aug. 22-26, 2022, pp. 1-7.

* cited by examiner

| | After Step 0 | After Step 1 | After Step 2 | After Step 2A | Step 3 Check | After Step 4A | After Step 4B | After Step 4C |
|---|---|---|---|---|---|---|---|---|
| DCI format 0_0 in CSS | Size A | | | | 3 different DCI sizes with C-RNTI ?<br>If no, go to step 4A~4C Otherwise, finish | Size A | Size A | Size A |
| DCI format 1_0 in CSS | Size A | | | | | Size A | Size A | Size A |
| DCI format 0_0 in USS | | Size B | | | | Size B → Size A | Size A | Size A |
| DCI format 1_0 in USS | | Size B | | | | Size B → Size A | Size A | Size A |
| DCI format 0_1 | | | Size C | | | Size C | Size C | Size C → Size H |
| DCI format 1_1 | | | Size D | | | Size D | Size D | Size D → Size H |
| DCI format 0_2 | | | | Size E | | Size E | Size E → Size G | Size G |
| DCI format 1_2 | | | | Size F | | Size F | Size F → Size G | Size G |

FIG. 3

| | After Step 0 | After Step 1 | After Step 2 | After Step 2A | After Step 2B | Step 3 Check | After Step 4A | After Step 4B | After Step 4C/4C' | After Step 4D |
|---|---|---|---|---|---|---|---|---|---|---|
| DCI format 0_0 in CSS | Size A | | | | | 3 different DCI sizes with C-RNTI ? If no, go to step 4A~4D Otherwise, finish | Size A | Size A | Size A | Size A |
| DCI format 1_0 in CSS | Size A | | | | | | Size A | Size A | Size A | Size A |
| DCI format 0_0 in USS | | Size B | | | | | Size B → Size A | Size A | Size A | Size A |
| DCI format 1_0 in USS | | Size B | | | | | Size B → Size A | Size A | Size A | Size A |
| DCI format 0_1 | | | Size C | | | | Size C | Size C | Size C → Size H | Size H → Size K |
| DCI format 1_1 | | | Size D | | | | Size D | Size D | Size D → Size H | Size H → Size K |
| DCI format 0_2 | | | | Size E | | | Size E | Size E → Size G | Size G | Size G → Size K |
| DCI format 1_2 | | | | Size F | | | Size F | Size F → Size G | Size G | Size G → Size K |
| DCI format 0_X | | | | | Size E' | | Size E' | Size E' | Size E' → Size I | Size I |
| DCI format 1_X | | | | | Size F' | | Size F' | Size F' | Size F' → Size I | Size I |

FIG. 5

| | After Step 0 | After Step 1 | After Step 2 | After Step 2A | After Step 2B | Step 3 Check | After Step 4A | After Step 4B | After Step 4C/4C' | After Step 4D |
|---|---|---|---|---|---|---|---|---|---|---|
| DCI format 0_0 in CSS | Size A | | | | | 3 different DCI sizes with C-RNTI ? If no, go to step 4A~4D Otherwise, finish | Size A | Size A | Size A | Size A |
| DCI format 1_0 in CSS | Size A | | | | | | Size A | Size A | Size A | Size A |
| DCI format 0_0 in USS | | Size B | | | | | Size B → Size A | Size A | Size A | Size A |
| DCI format 1_0 in USS | | Size B | | | | | Size B → Size A | Size A | Size A | Size A |
| DCI format 0_1 | | | Size C | | | | Size C | Size C | Size C → Size H | Size H |
| DCI format 1_1 | | | Size D | | | | Size D | Size D | Size D → Size H | Size H |
| DCI format 0_2 | | | | Size E | | | Size E | Size E → Size G | Size G | Size G |
| DCI format 1_2 | | | | Size F | | | Size F | Size F → Size G | Size G | Size G |
| DCI format 0_X | | | | | Size E' | | Size E' | Size E' | Size E' → Size I | Size I → Size K |
| DCI format 1_X | | | | | Size F' | | Size F' | Size F' | Size F' → Size I | Size I → Size K |

FIG. 6

METHOD FOR HANDLING A MULTI-CELL SCHEDULING AND USER EQUIPMENT

CROSS-REFERENCE TO RELATED APPLICATION

This application claims the priority benefit of U.S. provisional patent application Ser. No. 63/411,130, filed on Sep. 29, 2022. The entirety of the above-mentioned patent application is hereby incorporated by reference herein and made a part of this specification.

BACKGROUND

Technical Field

The present disclosure generally relates to a method for handling a multi-cell scheduling and a user equipment (UE).

Description of Related Art

A user equipment (UE) may be served by multiple cells. For example, FIG. 1 is a schematic diagram that illustrates an example of multi-cell communications. Referring to FIG. 1, transmission reception point (TRP) #1 provides four cells Cell #0~Cell #3, and TRP #2 provides two cells Cell #0~Cell #1. Furthermore, one or some of the cells Cell #0~Cell #3 may support multi-panel operation, but others may support single-panel operation. However, the legacy DCI does not provide a proper field in the control signaling to indicate multi-panel operation for multi-cell scheduling.

SUMMARY

Accordingly, the present disclosure is directed to a method for handling a multi-cell scheduling and a UE.

According to one or more exemplary embodiments of the disclosure, a method for handling a multi-cell scheduling is used by a UE. The method includes: receiving a downlink control information (DCI) from a first serving cell; determining a first number of multiple scheduled cells according to the DCI, where the DCI is configured to schedule at least one communication on the scheduled cells; and performing the at least one communication on at least one of the first number of the scheduled cells according to the DCI. The DCI includes at least one single DCI field, at least one separate DCI field, and at least one configurable DCI field.

According to one or more exemplary embodiments of the disclosure, a UE includes a transceiver, a memory, and a processor. The transceiver is used for transmitting or receiving signals. The memory is used for storing a program code. The processor is coupled to the transceiver and the memory. The processor is configured for executing the program to: receive, through the transceiver, a DCI from a first serving cell; determine a first number of multiple scheduled cells according to the DCI, where the DCI is configured to schedule at least one communication on the scheduled cells; and perform the at least one communication on at least one of the first number of the scheduled cells according to the DCI. The DCI includes at least one single DCI field, at least one separate DCI field, and at least one configurable DCI field.

According to one or more exemplary embodiments of the disclosure, a method for handling a multi-cell scheduling is used by a network device. The method includes: configuring a DCI scheduling a first number of multiple scheduled cells; and transmitting the DCI via a first serving cell to a UE for performing multiple multi-cell communications on the scheduled cells. The DCI includes at least one a single DCI field, at least one separate DCI field, and at least one configurable DCI field.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a schematic diagram that illustrates DCI size alignment for each step.

FIG. 5 is a schematic diagram that illustrates DCI size alignment for each step according to an exemplary embodiment of the present disclosure.

FIG. 6 is a schematic diagram that illustrates DCI size alignment for each step according to an exemplary embodiment of the present disclosure.

DESCRIPTION OF THE EMBODIMENTS

Figure 1:
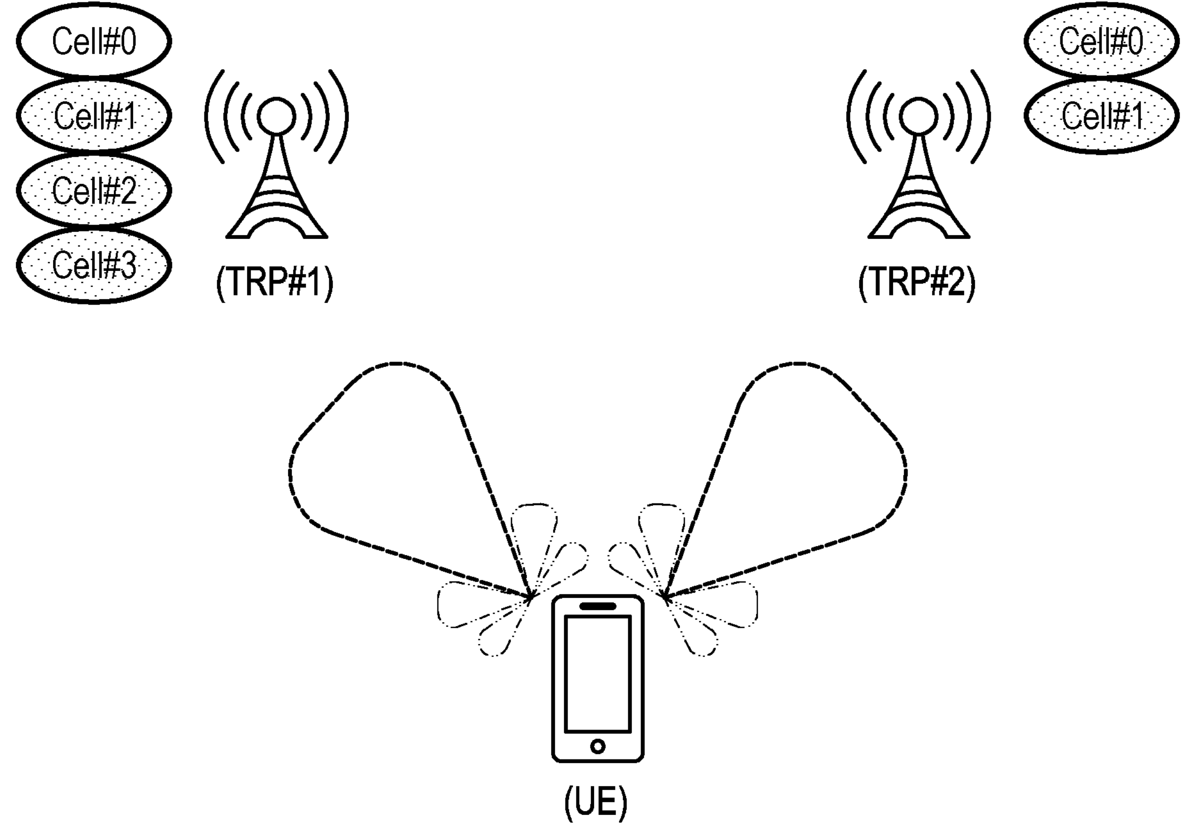
FIG. 1 is a schematic diagram that illustrates an example of multi-cell communications.

Reference will now be made in detail to the present preferred embodiments of the disclosure, examples of which are illustrated in the accompanying drawings. Wherever possible, the same reference numbers are used in the drawings and the description to refer to the same or like parts.

The abbreviations in the present disclosure are defined as follows and unless otherwise specified, the acronyms have the following meanings:

| Abbreviation | Full name |
|---|---|
| BWP | Bandwidth part |
| CB | Codebook |
| CC | Component carrier |
| CDM | Code division multiplexing |
| CG | Configure grant |
| CI | Cancellation indicator/indication |
| CIF | Carrier indicator field |
| CORESET | Control resource set |
| CRC | Cyclic redundancy check |
| CSI | Channel status information |
| CW | Codeword |
| C-RNTI | Cell RNTI |
| DAI | Downlink Assignment Index |
| DCI | Downlink control information |
| DL | Downlink |
| DMRS | Demodulation reference signal |
| FDRA | Frequency domain resource assignment |
| gNB | Next generation node B |
| HARQ-ACK | Hybrid Automatic Repeat request acknowledgement |
| ID | Identity |
| INT | interuption |
| MAC | Media Access Control |
| MCS | Modulation coding scheme |
| NACK | Negative acknowledgement |
| NDI | New Data Indicator |
| NR | New radio |
| OFDM | Orthogonal Frequency Division Multiplexing |
| Pcell | Primary Cell |
| PDCCH | Physical downlink control channel |
| PDSCH | Physical downlink shared channel |
| PHY | Physical |
| PL-RS | pathloss reference signal |
| PRB | physical resource block |
| PTRS | Phase-tracking reference signal |
| PUCCH | Physical uplink control channel |
| PUSCH | Physical uplink shared channel |
| QAM | Quadrature Amplitude Modulation |
| QCL | quasi-co-location |
| RA | Resource allocation |
| RE | Resource element |
| RNTI | Radio Network Temporary Identity |
| RRC | Radio Resource Control |
| RS | Reference signal |
| RV | Redundancy version |
| SCell | Secondary cell |
| SCS | Sub-carrier spacing |
| SFI | Slot format indicator |
| SLIV | Start and length indicator value |
| SP | Semi Persistent |
| SPS | Semi Persistent Scheduling |
| SRI | SRS resource indicator |
| SRS | Sounding reference signal |
| SS | Search space |
| SSB | Synchronization Signal Block |
| TB | Transport block |
| TCI | Transmission configuration indication |
| TDRA | Time domain resource assignment |
| TPC | Transmission power control |
| TPMI | Precoding information and number of layers |
| TRP | Transmission reception point |
| UCI | Uplink control information |
| UE | User equipment |
| UL | Uplink |
| UL-SCH | Uplink shared channel |
| URLLC | Ultra-reliable low latency communications |
| USS | UE-specific search space |

Some embodiments are introduced first.

A DCI in this disclosure may also known as a DCI format.

A DCI or DCI format in this disclosure may also known as a PDCCH.

The DCI for multi-cell scheduling may be monitored in USS set.

The DCI for multi-cell scheduling may be a DCI format with CRC scrambled by a C-RNTI.

A PUSCH may be transmitted in a UL BWP of a serving cell.

A (e.g., UL and/or DL) BWP is a contiguous set of PRB(s) on a given carrier. UE can be configured with maximum 4 BWP for Downlink and Uplink but at a given point of time only one BWP is active for downlink and one for uplink. Each BWP defined for numerology may have different Subcarrier spacing, Symbol duration, and/or Cyclic prefix (CP) length.

A serving cell in this disclosure may be also known as a cell, a carrier, or a component carrier.

The maximum number of co-scheduled cells by a DCI is 4.

In this disclosure, the multiple PUSCH are scheduled in multiple serving cell (e.g., one PUSCH per cell) by a DCI.

For a UE, according to its capability, the maximum number of co-scheduled cells by a DCI format may be smaller than or equal to the maximum number of co-scheduled cells supported by the network or gNB.

For multiple cell scheduling, the scheduling cell and scheduled cell may be configured in a cell group. The cell group, for example, may be a PUCCH group.

For multiple cell scheduling, the co-scheduled cells may be configured with the same SCS configuration.

For multi-cell scheduling, the scheduling cell and co-scheduled cells may be configured with the same SCS configuration.

In this disclosure, a type-1 field may be treated as a common field or 1st field; a type-2 field may be treated as a separate field or 2nd field and a type-3 field may be treated as a configurable field or 3rd field. But not limited herein.

Combinations of embodiments disclosed in this document should not be precluded.

In this disclosure, it is not precluded that at least one PUSCH on a serving cell is scheduled by a DCI, and the DCI can schedule PUSCH(s) on one cell (i.e., a single cell scheduling DCI).

In the disclosure, one or more issues are studied to support multi-cell scheduling from a group of candidate serving cells:

New DCI format with a new type (Type-3) of DCI field. The length, the ordering of DCI fields, the structure of type-3 field, and some parameters need to be defined.

Multi-panel operation with multi-cell scheduling needs to be supported.

In one embodiment, a new DCI format is introduced. For multi-cell scheduling: DCI format 0_X is used for scheduling multiple PUSCHs on multiple cells with one PUSCH per cell;

DCI format 1_X is used for scheduling multiple PDSCHs on multiple cells with one PDSCH per cell.

In one embodiment, different TB s are respectively scheduled on different cells by DCI format 0_X. In one embodiment, different TB s are respectively scheduled on different cells by DCI format 1_X.

In one embodiment, the DCI for multi-cell scheduling is monitored only in the USS set.

In one embodiment, all the co-scheduled cells by a DCI format 0_X/1_X and the scheduling cell are included in the same PUCCH group.

In one embodiment, DCI format 0_X/1_X on a scheduling cell can be used to schedule PUSCHs/PDSCHs on multiple cells including the scheduling cell.

In one embodiment, DCI format 0_X/1_X on a scheduling cell can be used to schedule PUSCHs/PDSCHs on multiple cells not including the scheduling cell.

In one embodiment, for a UE, the maximum number of cells scheduled by a DCI format 0_X can be the same or different from the maximum number of cells scheduled by a DCI format 1_X.

In one embodiment, for a DCI format supporting multi-cell scheduling, the UE may determine a number of co-scheduled serving cell (e.g., X0 for DCI format 0_X and X1 for DCI format 1_X) according to gNB configuration (e.g., SS configuration) or indicated by the DCI format 0_X/1_X.

In one embodiment, for the DCI format (e.g., DCI format 0_X and/or DCI format 1_X), the UE may determine a set of candidate cells that can be co-scheduled by the DCI format, where: the set of candidate cells may included in the same PUCCH group;

the set of candidate cells may be configured by a higher layer signal (e.g., a SS configuration). In one embodiment, for discussing the field design of DCI format 0_X/1_X which schedules more than one cell, reformulate the types of DCI fields as below:

Type-1 field:

- Type-1A field: A single field indicating common information to all the co-scheduled cells;
- Type-1B field: A single field indicating separate information to each of co-scheduled cells via joint indication;
- Type-1C field: A single field indicating information to only one of co-scheduled cells.

Type-2 field: Separate field for each of the co-scheduled cells.

Type-3 field: Common or separate to each of the co-scheduled cells, or separate to each sub-group, dependent on explicit configuration.

It should be noted that one sub-group includes a subset of co-scheduled cells where a single field is commonly applied to the co-scheduled cell(s) belonging to a same sub-group.

In one embodiment, for multi-cell scheduling, the co-scheduled cells are indicated by DCI format 0_X/1_X. At least the following options are considered:

option 1: an indicator in the DCI points to one row of a table defining combinations of scheduled cells:

- the table is configured by RRC signaling;

Separate tables may be configured for multi-cell PDSCH scheduling and multi-cell PUSCH scheduling;

option 2: an indicator in the DCI is a bitmap corresponding to a set of configured cells that can be scheduled by the DCI 0_X/1_X:

- separate sets of configured cells for multi-cell PDSCH scheduling and multi-cell PUSCH scheduling;

option 3: using existing field (e.g., CIF, FDRA) to indicate whether one or more cells are scheduled or not.

In one embodiment, a DCI size alignment is performed over all search spaces configured at a BWP and across all slots, then for a given DCI format at a given search space, the DCI size is the same across slots. In one embodiment, there is no slot-by-slot dependence (other than for BWP switching or when some RRC configurations become invalid based on specifications). In one embodiment, a UE may expect to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

Figure 2:
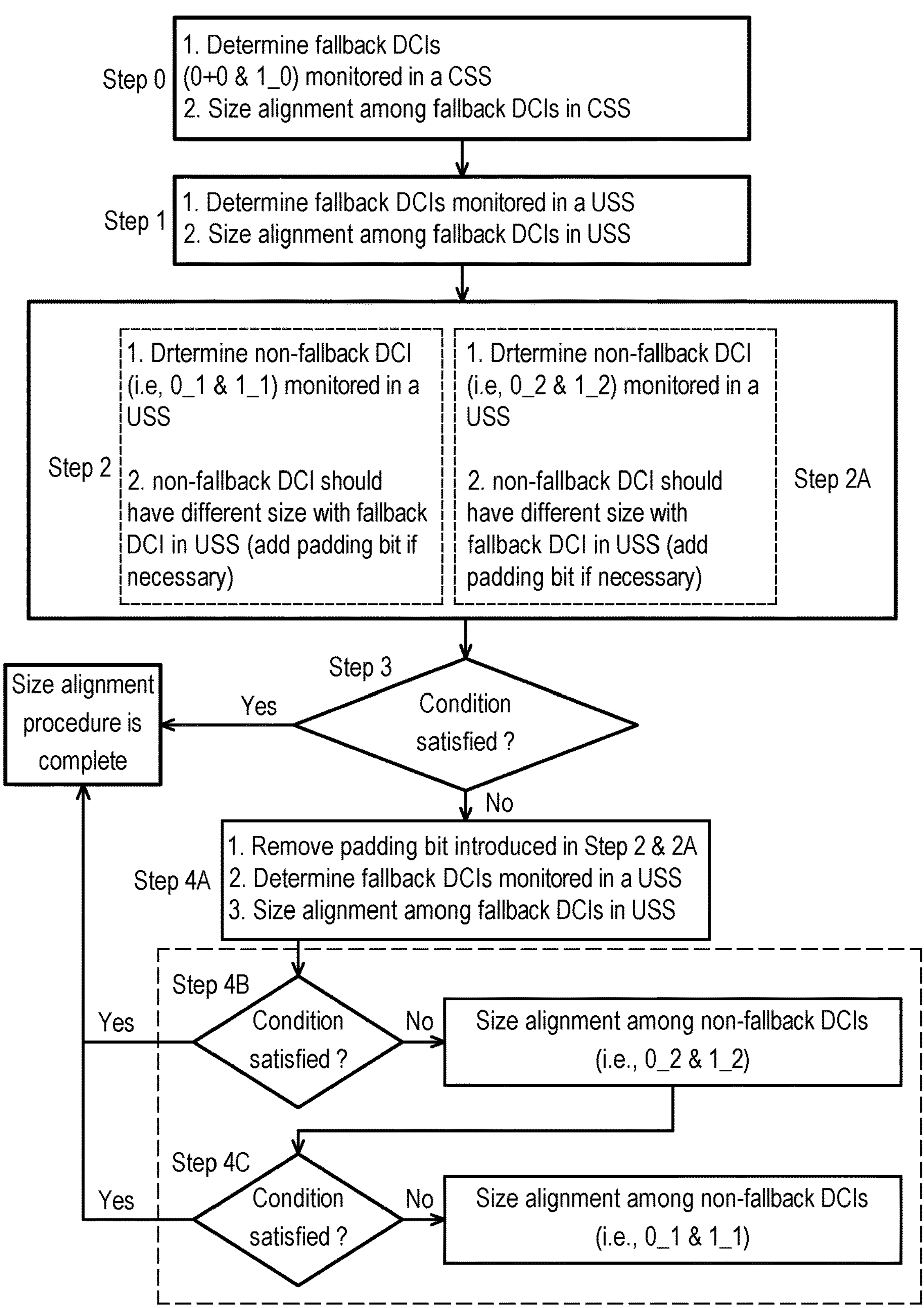
FIG. 2 is a schematic diagram that illustrates DCI size alignment.

FIG. 2 is a schematic diagram that illustrates DCI size alignment. Referring to FIG. 2, in Step 0, fallback DCIs (e.g., formats 0_0 and 1_0) monitored in a CSS are determined, and the size alignment is performed among fallback DCIs in CSS. In Step 1, fallback DCIs monitored in a USS are determined, and the size alignment is performed among the fallback DCIs in USS. In Step 2, the non-fallback DCIs (i.e., formats 0_1 and 1_1) monitored in a USS are determined, and the non-fallback DCIs should have a different size from the fallback DCI in USS (by adding padding bit if necessary. In Step 2A, the non-fallback DCIs (i.e., formats 0_2 and 1_2) monitored in a USS are determined, and the non-fallback DCI should have a different size from the fallback DCI in USS (e.g., by adding padding bit if necessary.

In Step 3, whether both of the following conditions are fulfilled is determined: the total number of different DCI sizes configured to monitor is no more than 4 for the cell; the total number of different DCI sizes with C-RNTI configured to monitor is no more than 3 for the cell. If both of the conditions are fulfilled, the size alignment procedure is complete.

If the conditions are not fulfilled, in Step 4A, the padding bit introduced in Step 2 and Step 2A is removed, the fallback DCIs monitored in a USS are determined, and the size alignment is performed among the fallback DCIs in the USS.

In Step 4B, whether the following conditions are fulfilled is determined:

the total number of different DCI sizes configured to monitor is more than 4 for the cell after applying the above steps; or the total number of different DCI sizes with C-RNTI configured to monitor is more than 3 for the cell after applying the above steps.

If the number of information bits in the DCI format 0_2 prior to padding is less than the payload size of the DCI format 1_2 for scheduling the same serving cell, a number of zero padding bits are generated for the DCI format 0_2 until the payload size equals that of the DCI format 1_2. If the number of information bits in the DCI format 1_2 prior to padding is less than the payload size of the DCI format 0_2 for scheduling the same serving cell, zeros shall be appended to the DCI format 1_2 until the payload size equals that of the DCI format 0_2.

In Step 4C, whether the following conditions are fulfilled is determined:

the total number of different DCI sizes configured to monitor is more than 4 for the cell after applying the above steps; or the total number of different DCI sizes with C-RNTI configured to monitor is more than 3 for the cell after applying the above steps.

If the number of information bits in the DCI format 0_1 prior to padding is less than the payload size of the DCI format 1_1 for scheduling the same serving cell, a number of zero padding bits are generated for the DCI format 0_1 until the payload size equals that of the DCI format 1_1. If the number of information bits in the DCI format 1_1 prior to padding is less than the payload size of the DCI format 0_1 for scheduling the same serving cell, zeros shall be appended to the DCI format 1_1 until the payload size equals that of the DCI format 0_1.

FIG. 3 is a schematic diagram that illustrates DCI size alignment for each step. Referring to FIG. 3, the lengths of DCI formats 0_0 and 1_0 in CSS are determined as size A, the lengths of DCI formats 0_0 and 1_0 in USS are determined as size B, the length of DCI format 0_1 is determined as size C, the length of DCI format 1_1 is determined as size D, the length of DCI format 0_2 is determined as size E, the length of DCI format 1_2 is determined as size F. In Step 4A, the lengths of DCI formats 0_0 and 1_0 in USS are aligneded as size A. In Step 4B, the lengths of DCI formats 0_2 and 1_1 are aligned as size G. In Step S4C, the lengths of DCI formats 0_1 and 1_1 are aligned as size H. Eventually, there are only 3 different DCI sizes, which are size A, size H, and size G.

Figure 4:
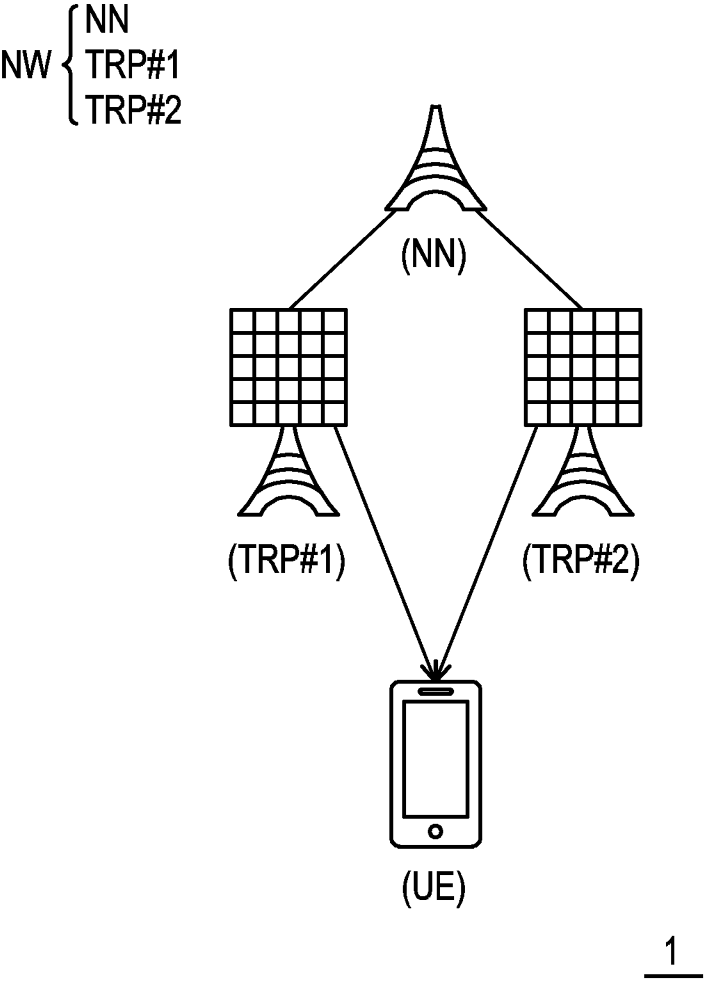
FIG. 4 is a schematic diagram that illustrates a radio communication network architecture according to an exemplary embodiment of the present disclosure.

FIG. 4 is a schematic diagram that illustrates a radio communication network architecture 1 according to an exemplary embodiment of the present disclosure. Referring to FIG. 4, a radio communication network architecture (e.g., a Long Term Evolution (LTE) system, an LTE-Advanced (LTE-A) system, an LTE-Advanced Pro system, or a 5G NR Radio Access Network (RAN)) typically includes one or more base station (BS) NW, one or more UEs, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, UE may include, but is not limited to, a mobile station, a mobile terminal or device, or a user communication radio terminal. For example, UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station NW may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station NW may include but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS NW may connect to serve one or more UEs through a radio interface to the network.

The base station (BS) NW (or called network device) may be operable to provide radio coverage to a specific geographical area using a plurality of cells included in the RAN. The BS NW may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS NW may communicate with one or more UEs in the radio communication system through the plurality of cells.

The base station NW may include a network node NN and one or more TRPs, such as TRP #1 and TRP #2.

A network node NN may be, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within one or more cells.

A TRP (e.g., TRP #1 or TRP #2), which may also be regarded as a remote radio head (RRH), may be a transceiver under the protocols of 5G NR wireless communication system and/or the protocols of a 4G wireless communication system. A TRP may be communicatively connected to a network node NN. The network node NN may connect to serve one or more UEs through one or more TRPs in the radio communication system. For example, TRP #1 and TRP #2 serve UE, but are not limited thereto.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

It should be understood that the terms “system” and “network” used in the disclosure are often used interchangeably. The term “and/or” in the disclosure is only an association relationship describing the associated objects, which means that there can be three kinds of relationships, for example, A and/or B, which can mean three situations: A is present alone, A and B are present simultaneously, or B is present alone. In addition, the character “/” in the disclosure generally indicates that the associated objects are in an “or” relationship.

To facilitate understanding of the technical solutions of the embodiments of the disclosure, the technical concepts related to the embodiments of the disclosure are described below.

In one embodiment, for multi-cell scheduling, a UE may determine the length (e.g., L) for a DCI format (e.g., DCI format 0_X/1_X) according to one or more higher layer configurations. In one embodiment, a higher layer configuration (e.g., a SS configuration) may indicate the DCI length. The length of DCI format 0_X/1_X may not equal the length for other DCI formats with CRC scrambled by C-RNTI. The length of DCI format 0_X/1_X may equal the length for other DCI formats with CRC scrambled by e.g., SFI-RNTI, INT-RNTI, CI-RNTI, TPC-PUCCH-RNTI, TPC-PUSCH-RNTI and/or TPC-SRS-RNTI. The DCI format 0_X and DCI format 1_X may be configured with the same length or different lengths.

In one embodiment, the length of the DCI format (e.g., DCI format 0_X/DCI format 1_X) may not equal to other DCI format(s) (e.g., DCI format 0_0/0_1, DCI format 0_1/1_1 and/or DCI format 0_2/1_2). For example, after a DCI size alignment, the length of DCI format 0_1/1_1 may equal the length of DCI format 0_2/1_2.

In one embodiment, the length of the DCI format (e.g., DCI format 0_X/DCI format 1_X) may equal to other DCI format(s) (e.g., DCI format 0_0/0_1, DCI format 0_1/1_1 and/or DCI format 0_2/1_2), for example, after a DCI size alignment.

For example, FIG. 5 is a schematic diagram that illustrates DCI size alignment for each step according to an exemplary embodiment of the present disclosure. Referring to FIG. 5, the length of DCI format 0_X is determined as size E', and the length of DCI format 1_X is determined as size F' which may equal E'. In Step 4C', the length of DCI formats 0_X and 1_X may be aligned as size I. However, after Step 4C/4C', there are four different DCI sizes. Therefore, in Step 4D, the lengths of DCI formats 0_1, 1_1, 0_2, and 1_2 are aligned as size K which equals the largest one of size G and size H.

FIG. 6 is a schematic diagram that illustrates DCI size alignment for each step according to an exemplary embodiment of the present disclosure. Referring to FIG. 6, alternatively, in step 4D, the lengths of the DCI formats 0_X and 1_X are aligned as size K which equals the largest one of size G and size H. After Step 4D, there are three different DCI sizes, and the conditions of Step 3 are fulfilled.

Figure 7:
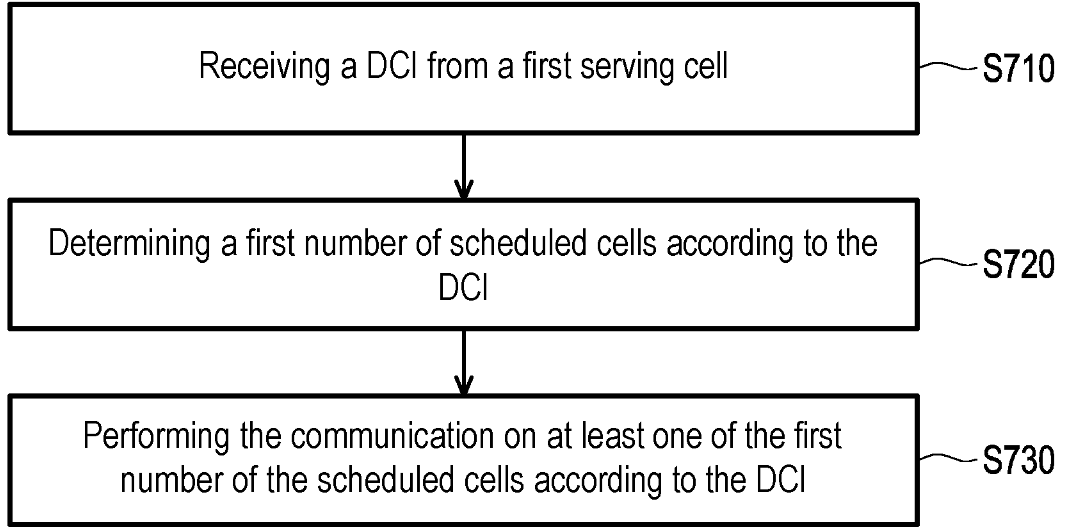
FIG. 7 is a flow chart that illustrates a method for handling a multi-cell scheduling according to an exemplary embodiment of the present disclosure.

FIG. 7 is a flow chart that illustrates a method for handling a multi-cell scheduling according to an exemplary embodiment of the present disclosure. Referring to FIG. 7, the method is adapted for a UE. The UE receives a DCI from a serving cell (Step S710). In one embodiment, the first serving cell is provided by TRP #1 or TRP #2 as shown in FIG. 4.

The UE determines the first number of multiple scheduled cells according to the DCI (Step S720). Specifically, the DCI is configured to schedule UE with one or more communications such as receiving PDSCH or transmitting PUSCH on the scheduled cells. The first number is a positive integer. In one embodiment, the UE may determine the first number of the scheduled cells from a third number of scheduled cells. The third number is a positive integer. The first number is less than or equals to the third number. For example, the first number is 3, and the third number is 4. The maximum number of the third number of serving cells is 4, and/or the minimum number of the first number of serving cells is 1.

The UE performs one or more communications on one or more of the first number of the scheduled cells according to the DCI (Step S730). Specifically, the DCI includes one or more single DCI fields, one or more separate DCI fields, and one or more configurable DCI fields.

Figure 8:
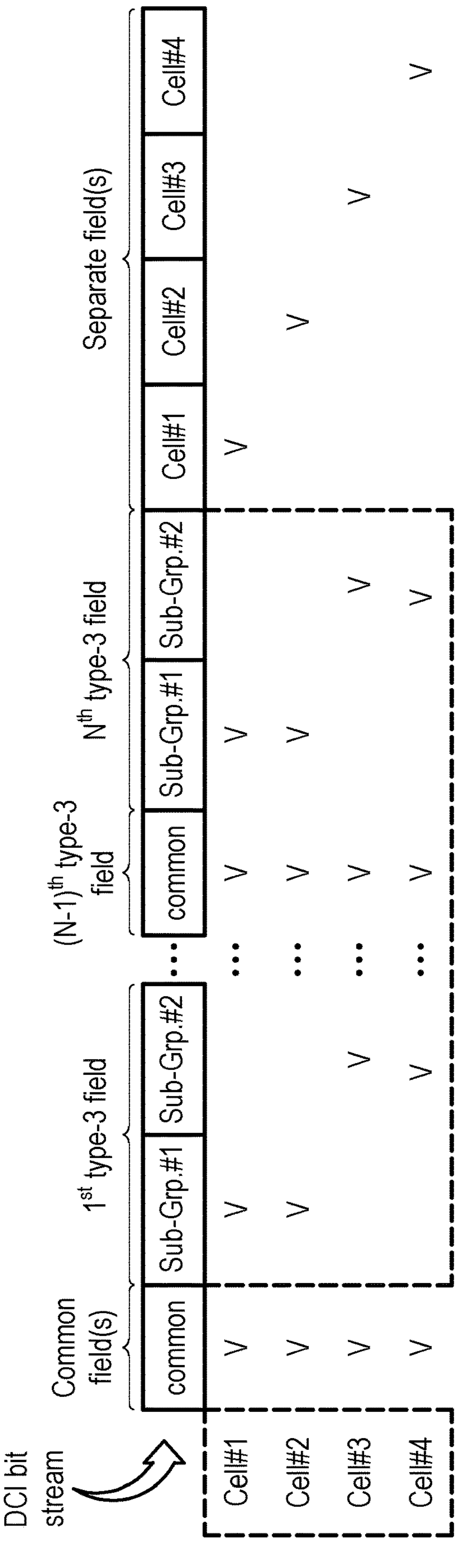
FIG. 8 is a schematic diagram that illustrates DCI fields for four cells according to an exemplary embodiment of the present disclosure.

For example, FIG. 8 is a schematic diagram that illustrates DCI fields for scheduling the communications on four cells according to an exemplary embodiment of the present disclosure. Referring to FIG. 8, in a DCI bit stream, there may be multiple common fields (i.e., the single DCI field), multiple separate fields (i.e., the separate DCI fields), and multiple type-3 fields (i.e., the configurable DCI fields). Each type-3 field could be a common, separate, or per sub-group information.

In one embodiment, the following types of DCI fields may be used for a DCI format for multi-cell scheduling:

- Type-1 field:
  - a single DCI field indicating common information to all the co-scheduled cells,
  - a single DCI field indicating separate information to each of the co-scheduled cells via joint indication, and/or
  - a single DCI field indicating information to only one of the co-scheduled cells;
- Type-2 field: separate field for each of the co-scheduled cells;
- Type-3 field: common or separate to each of the co-scheduled cells, or separate to each sub-group, according to a higher layer configuration.

In one embodiment, one sub-group may include a subset of co-scheduled cells where a single DCI field is commonly applied to the co-scheduled cell(s) belonging to the same sub-group. The single DCI field may:

- indicate common information (e.g., PTRS-DMRS association), or
- indicate separate information to each of co-scheduled cells in the same sub-group via joint indication (e.g., TCI, SRI).

In one embodiment, the following information is transmitted by means of the DCI format:

- Part 1: identifier for DCI formats (e.g., DCI format 0_X or 1_X)—e.g., one bit;
- Part 2: co-scheduled cells indicator, e.g., the number of co-scheduled cells=X;
- Part 3: at least one DCI field indicating common information for all co-scheduled cells (e.g., type-1 field);

Part 4: for each of the (e.g., type-3 field) DCI field, determining the number of bits according to a higher layer signal (e.g., common, per sub-group, or separate);

Part 5: a first group of DCI fields specific for a first co-scheduled cell, e.g., the lowest cell-ID among the co-scheduled cells, (for example, #1 in FIG. 8);

Part 6: a second group of DCI fields specific for a second co-scheduled cell, e.g., the 2nd lowest cell-ID among the co-scheduled cells, (for example, #2 in FIG. 8);

Part X+4: a X-th group of DCI fields specific for a X-th co-scheduled cell, e.g., the highest cell-ID among the co-scheduled cells, (for example, #4 in FIG. 8);

Part X+5: padding bits, if required. Part 5 to Part X+4 are type-2 fields.

In one embodiment, the following information is transmitted by means of the DCI format:

Part 1: an identifier for DCI formats (e.g., DCI format 0_x or 1_x)—e.g., one bit;

Part 2: co-scheduled cells indicator, e.g., number co-scheduled cell=X;

Part 3: for each of the remaining DCI fields in the DCI format, determine the number of bits according to its type (e.g., common, per sub-group, or separate);

Part 4: padding bits, if required.

In one embodiment, the single DCI field corresponds to one, some, or all of the first number of the scheduled cells on which the UE performs one or more communications (such as receiving PDSCH or transmitting PUSCH). That is when or only when the single DCI field indicates information for the scheduled cells from the first number of the scheduled cells, the UE may receive PDSCH or transmit PUSH on the scheduled cells which are indicated in the single DCI field.

Taking FIG. 8 as an example, the common field indicates information for Cell #1~Cell #4. Cell #1~Cell #4 are co-scheduled cells indicated by the DCI. Therefore, a UE, which received the DCI, may receive PDSCH or transmit PUSH on Cell #1~Cell #4.

Figure 9:
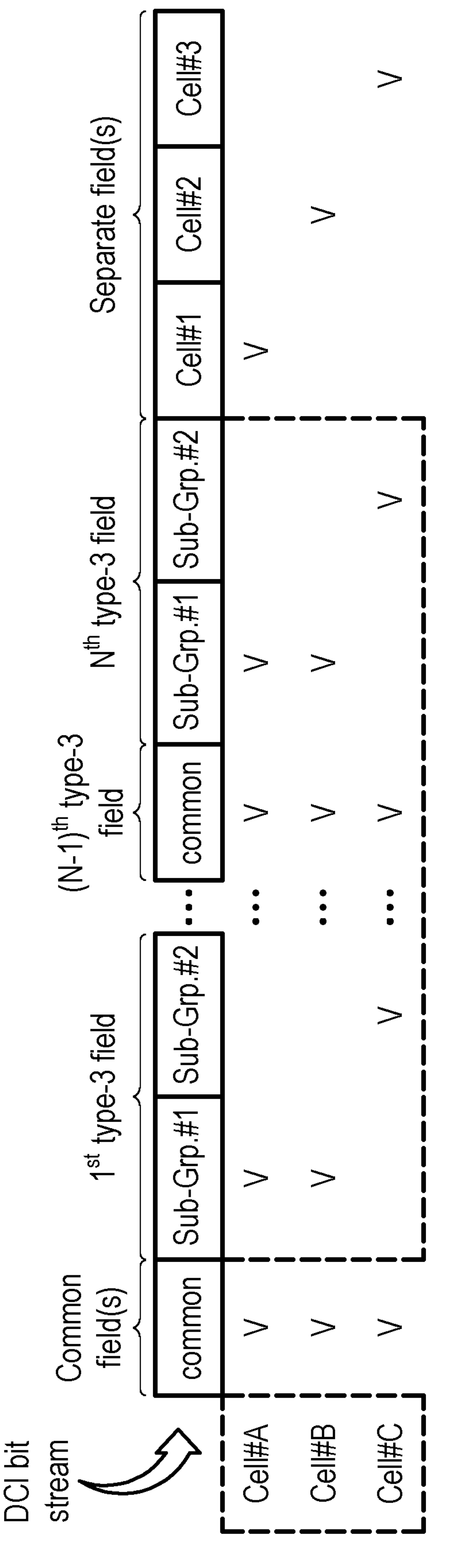
FIG. 9 is a schematic diagram that illustrates DCI fields for three cells according to an exemplary embodiment of the present disclosure.

FIG. 9 is a schematic diagram that illustrates DCI fields for three cells according to an exemplary embodiment of the present disclosure. FIG. 9, the common field indicates information for Cell #1~Cell #3. Cell #1~Cell #3 are co-scheduled cells indicated by the DCI. Therefore, a UE, which received the DCI, may receive PDSCH or transmit PUSH on Cell #1~Cell #3.

Figure 10:
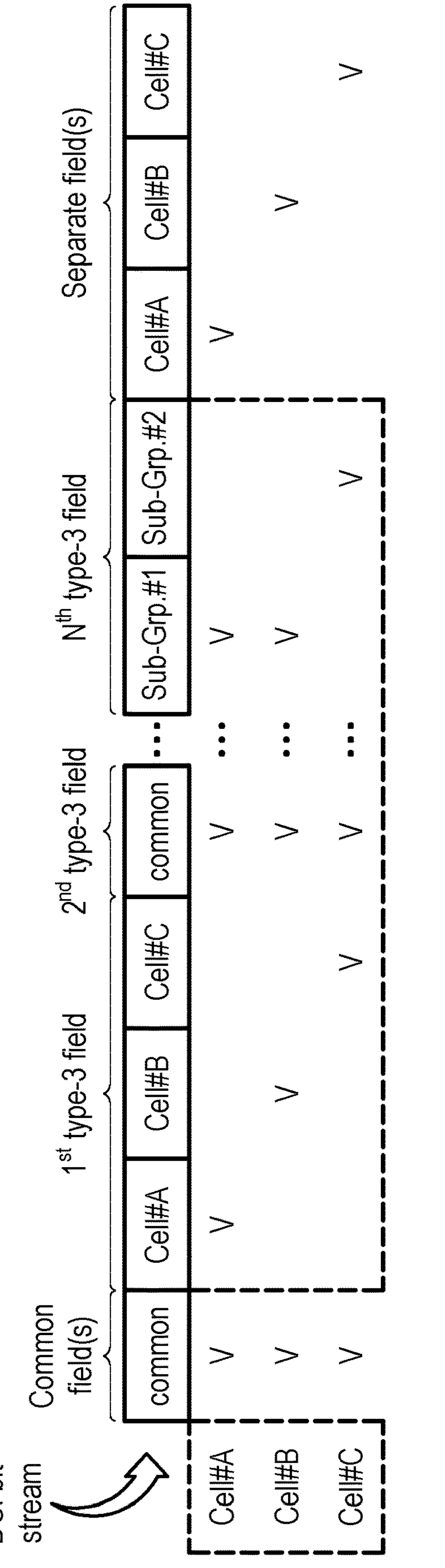
FIG. 10 is a schematic diagram that illustrates DCI fields for three cells according to an exemplary embodiment of the present disclosure.

FIG. 10 is a schematic diagram that illustrates DCI fields for three cells according to an exemplary embodiment of the present disclosure. Referring to FIG. 10, the common field indicates information for Cell #A~Cell #C. Cell #A~Cell #C are co-scheduled cells indicated by the DCI. Therefore, a UE, which received the DCI, may receive PDSCH or transmit PUSH on Cell #A~Cell #C.

In one embodiment, the single DCI field may include at least one of:

an identifier for DCI format (e.g., DCI format 0_X or 1_X) in, for example, one bit;

a co-scheduled cells indicator (e.g., Number co-scheduled cell=X);

a bandwidth part (BWP) indicator for the plurality of scheduled cells that support dynamic BWP switching;

a downlink assignment index;

a transmission power control (TPC) command for a physical uplink control channel (PUCCH) (if the DCI format is DCI format 1_X);

a PUCCH resource indicator (if the DCI format is DCI format 1_X);

a physical downlink shared channel-to-hybrid automatic repeat request (PDSCH-to-HARQ) timing indicator (if the DCI format is DCI format 1_X);

a one-shot HARQ-ACK request (if the DCI format is DCI format 1_X);

a beta offset indicator (if the DCI format is DCI format 0_X);

a channel state information (CSI) request (if the DCI format is DCI format 0_X); and a time domain resource allocation (TDRA).

In one embodiment, the separate DCI field corresponds to a second number of information blocks, and each information block indicates control information for one of the scheduled cells. Taking FIG. 8 as an example, the separate fields indicate control information for Cell #1~Cell #4 per information block, respectively. That is four information blocks correspond to Cell #1~Cell #4, respectively. Taking FIG. 9 as an example, the separate fields indicate control information for Cell #1~Cell #3 per information block, respectively. Taking FIG. 10 as an example, the separate fields indicate control information for Cell #A~Cell #C per information block, respectively.

In one embodiment, the second number equals to the first number. For example, if there are four scheduled cells, the DCI includes separate DCI field with four information blocks.

In one embodiment, the second number of information blocks are placed according to an ascending order of a serving cell index, and the first information block corresponds to the smallest serving cell index. Taking FIG. 8 as an example, the ascending order is #1, #2, #3, and #4. The first information block corresponds to Cell #1. Taking FIG. 10 as an example, the ascending order is #A, #B, and #C. The first information block corresponds to Cell #A. However, in other embodiments, the order of the information blocks may be placed according to a descending order or another order of the serving cell index.

In one embodiment, the control information corresponds to one of the following: a new data indicator (NDI);

a redundancy version (RV);

a modulation coding scheme (MCS); and a frequency domain resource assignment (FDRA).

In one embodiment, a UE may determine whether a type-3 field (e.g., the configurable field) is a common field or a separate field to each of the first number of scheduled cells (e.g., the co-scheduled cells), or a separate field to each sub-group, according to a higher layer configuration.

In one embodiment, a UE may determine one of one or more configurable DCI fields corresponding to the first number of the scheduled cells in an event that the configurable DCI field is a first type, and the UE may determine one of one or more configurable DCI fields including multiple information blocks in which each information block corresponding to a sub-group or one of the first number of the scheduled cells in an event that the configurable DCI field is a second type. For example, the first type is the aforementioned type-1 or common type, and the second type is the aforementioned type-2 or the separate type. Taking FIG. 8 as an example, the $(N-1)^{th}$ type-3 field is the common DCI field, and the common field corresponds to all Cell #1~Cell #4. The $N^{th}$ type-3 fields are the separate fields, where each information block of the separate fields corresponds to one sub-group. One sub-group may be any combination of Cell #1~Cell #4 based on a higher layer configuration. Taking FIG. 10 as an example, the first type-3 fields are separate fields, where each information block of the separate fields corresponds to one of Cell #A~Cell #C.

In one embodiment, for the DCI (type-3) field, the UE may receive a higher layer (e.g., SS configuration) configuration to determine whether the DCI field is common filed (Case 1), separate field (Case 2) or common filed for a sub-group (Case 3) of co-scheduled cell. For example, the configuration may include at least one of:

- an identity of type-3 field, e.g., Type3FieldID;
- a set of serving cell(s) corresponding to the Type3FieldID, e.g., Type3CellGroup;
- a field type (e.g., FieldType) to indicate the DCI field as one of the following cases:
  - separate field/information for all cells,
  - indicating common field/information, or
  - indicating separate fields/information to each of the co-scheduled cells in the same sub-group via joint indication;
- a reference cell (e.g., ReferenceCell) for determining information from the DCI field if the field type is indicated as a common field;
- a list of DCI fields, e.g., Rate matching indicator, ZP CSI-RS trigger, TCI, etc.

In one embodiment, the configurable DCI field comprises at least one of:

- a rate matching indicator;
- a zero power (ZP) channel state information-reference signal (CSI-RS) trigger;
- precoding information and number of layers;
- a phase-tracking reference signal-demodulation reference signal (PTRS-DMRS) association;
- an antenna port;
- a transmission configuration indicator (TCI);
- a sounding reference signal (SRS) request;
- a DMRS sequence initialization;
- an SRS resource indicator (SRI); and
- a physical reference block (PRB) bundling size indicator.

In one embodiment, for a set of DCI fields, each of the set of DCI fields indicates common information for a sub-group of the first number of the scheduled cells (e.g., co-scheduled cells). For example, a set of SRI fields includes 2 SRIs, where the first SRI indicates common information for a first sub-group of co-scheduled cells, and the second SRI indicates common information for a second sub-group of co-scheduled cells. For another example, the PRB bundling size indicator includes 2 bits, where the first bit indicates a first PRB bundling size for a first sub-group of co-scheduled cells, and the second bit indicates a first PRB bundling size for a second sub-group subset of co-scheduled cells.

In one embodiment, according to a higher layer configuration, a subset of co-scheduled cells may include one serving cell, for example, the aforementioned first serving cell. A set of DCI fields includes X individual information for X co-scheduled cells, respectively. Taking FIG. 8 as an example, X=4, and the DCI fields include four individual information blocks for Cell #1~Cell #4.

In one embodiment, according to a higher layer configuration, a subset of co-scheduled cells may include all co-scheduled cells. Taking FIG. 9 as an example, a subset of co-scheduled cells includes Cell #1~Cell #3.

In one embodiment, when a UE is configured with a DCI format for multi-cell PUSCH/PDSCH scheduling (e.g., from M candidate serving cells). For each of the scheduled serving cell(s), the UE may determine the TDRA according to a common TDRA field in the DCI format. For example, in Table (1), each codepoint of the TDRA field may include at least one of K0 (or K2), SLIV, and mapping type for each of the M candidate serving cells. M may be a predetermined value, fixed value, or configured by the network device. The UE may determine a TDRA for each of the scheduled serving cell(s) according to their own TDRA configuration and numerology (e.g., SCS) of PDCCH and PUSCH/PDSCH.

TABLE 1

| TDRA codepoint | K0 & SLIV for 1st candidate cell | K0 & SLIV for 2nd candidate cell | | K0 & SLIV for Mth candidate cell |
|---|---|---|---|---|
| 0 | $K0_{1,0}$, $SLIV_{1,0}$ | $K0_{2,0}$, $SLIV_{2,0}$ | . . . | $K0_{M,0}$, $SLIV_{M,0}$ |
| 1 | $K0_{1,1}$, $SLIV_{1,1}$ | $K0_{2,1}$, $SLIV_{2,1}$ | | $K0_{M,1}$, $SLIV_{M,1}$ |
| 2 | $K0_{1,2}$, $SLIV_{1,2}$ | $K0_{2,2}$, $SLIV_{2,2}$ | | $K0_{M,2}$, $SLIV_{M,2}$ |
| 3 | $K0_{1,3}$, $SLIV_{1,3}$ | $K0_{2,3}$, $SLIV_{2,3}$ | | $K0_{M,3}$, $SLIV_{M,3}$ |
| . . . | . . . | . . . | | . . . |
| X | $K0_{1,X}$, $SLIV_{1,X}$ | $K0_{2,X}$, $SLIV_{2,X}$ | | $K0_{M,X}$, $SLIV_{M,X}$ |

Figure 11:
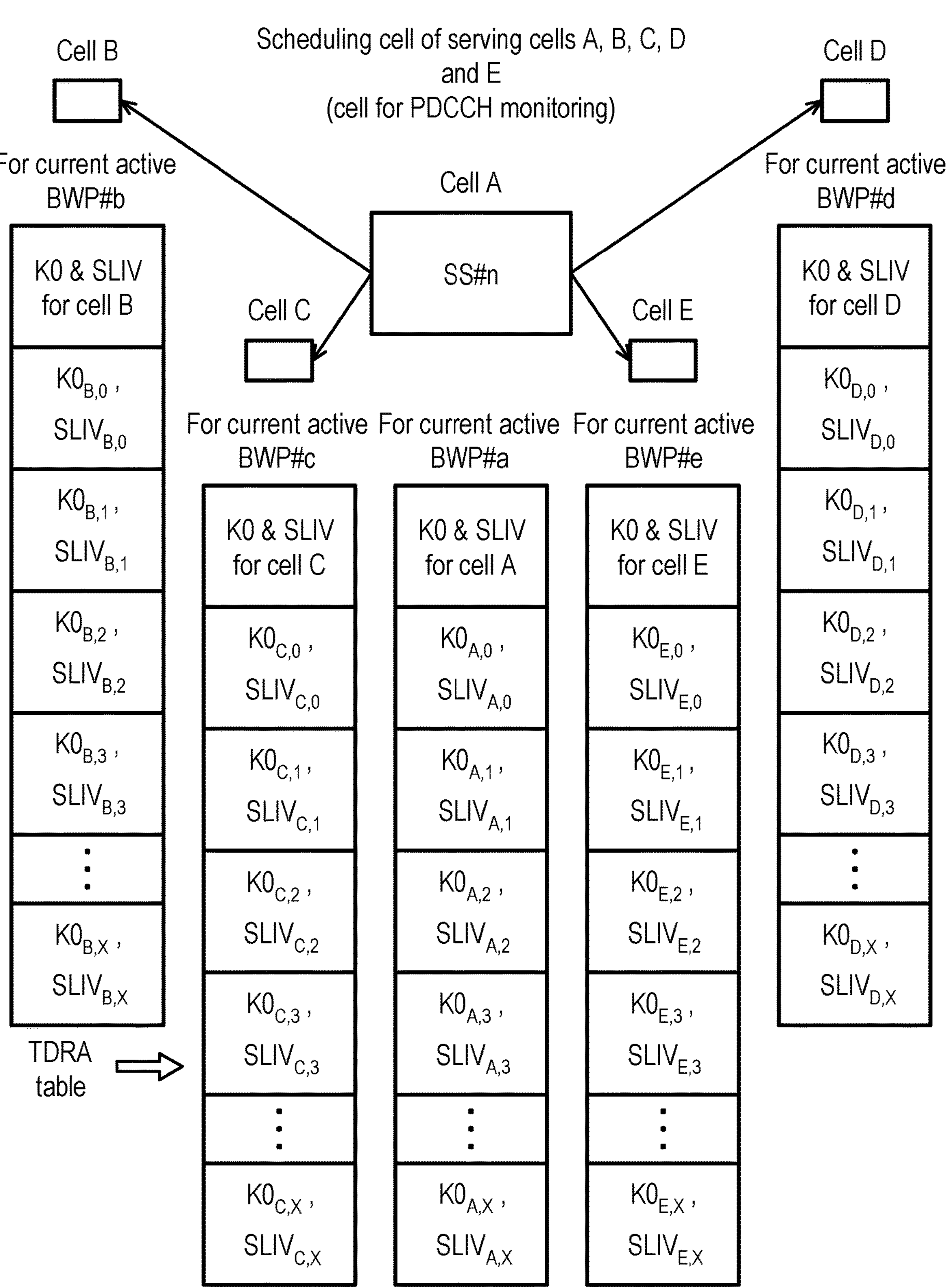
FIG. 11 is a schematic diagram that illustrates DCI fields with joint indication according to an exemplary embodiment of the present disclosure.

FIG. 11 is a schematic diagram that illustrates DCI fields with joint indication according to an exemplary embodiment of the present disclosure. Referring to FIG. 11, a DCI indicates a multi-cell PDSCH transmission on Cell B and Cell C (selected from cell A~Cell E), and the TDRA field indicates 3. Therefore, the UE may determine the TDRA according to $K0_{B,3}$ and $SLIV_{B,3}$ for the PDSCH transmissions on Cell B and determine the TDRA according to $K0_{C,3}$ and $SLIV_{C,3}$ for the PDSCH transmissions on Cell C.

In one embodiment, a UE may apply one of one or more configurable DCI fields to the scheduled cells in an event that type information is absent from one of the configurable DCI fields. The type information indicates one of one or more configurable DCI fields as one of one or more single DCI fields, and/or the type information indicates one of one or more configurable DCI fields as one of one or more separate DCI fields. Each configurable DCI field has corresponding type information. The type information is provided via a higher layer signaling. The event is that, for example, gNB does not configure the type information for one of the configurable DCI field via a higher layer signaling, or DCI does not carry the type information or has no corresponding field of the type information. The event is that, for another example, the DCI has a corresponding field of the type information, but the field is configured as zero, null, or invalid. For example, for a DCI format 0_X/1_X, if there is no information/configuration for UE to determine whether a type-3 field is common filed, separate filed, or separate filed to each sub-group of co-scheduled cells, the UE may treat the type-3 field as a common field. The common field indicates information for one or more co-scheduled cells.

In one embodiment, a UE may determine one of one or more configurable DCI fields corresponding to a second number of information blocks in an event that type information is absent from one of one or more configurable DCI fields. The type information indicates one of one or more configurable DCI fields as one of one or more single DCI fields or one of one or more separate DCI fields. Each configurable DCI field has corresponding type information. The type information is provided via a higher layer signaling. The event is that, for example, gNB does not configure the type information for one of the configurable DCI field via a higher layer signaling, or DCI does not carry the type information or has no corresponding field of the type information. The event is that, for another example, the DCI has a corresponding field of the type information, but the field is configured as zero, null, or invalid. For example, for a DCI format 0_X/1_X, if there is no information/configuration for UE to determine whether a type-3 field is common filed, separate filed, or separate filed to each sub-group of co-scheduled cells, the UE may treat the type-3 field as a separate field. Each separate field indicates control information for one co-scheduled cell. In one embodiment, the second number equals to the first number.

In one embodiment, the DCI is configured in a UE-specific search space (USS) and the length of the DCI is determined according to one or more higher layer configurations. For example, the higher layer configuration is the USS configuration.

In one embodiment, the DCI is scrambled by a cell-radio network temporary identity (C-RNTI) and the length of the DCI is not equal to the length of a first DCI (i.e., another DCI) with a different format scrambled by the C-RNTI.

In one embodiment, a UE may determine the length of information blocks in the separate DCI field or in the configurable DCI field to be the same. The length of each separate DCI field or each configurable DCI field is predetermined. Taking FIG. 8 as an example, the length of the four information blocks of separate fields respectively for Cell #1~Cell #4 is the same. In one embodiment, a UE may determine the length of a information block in the separate DCI field or in the configurable DCI field according to one or more higher-layer signaling. One higher layer signaling is used for one of the information blocks corresponding to a scheduled cell. For example, a RRC configuration indicates the length of the information block in one field.

Figure 12:
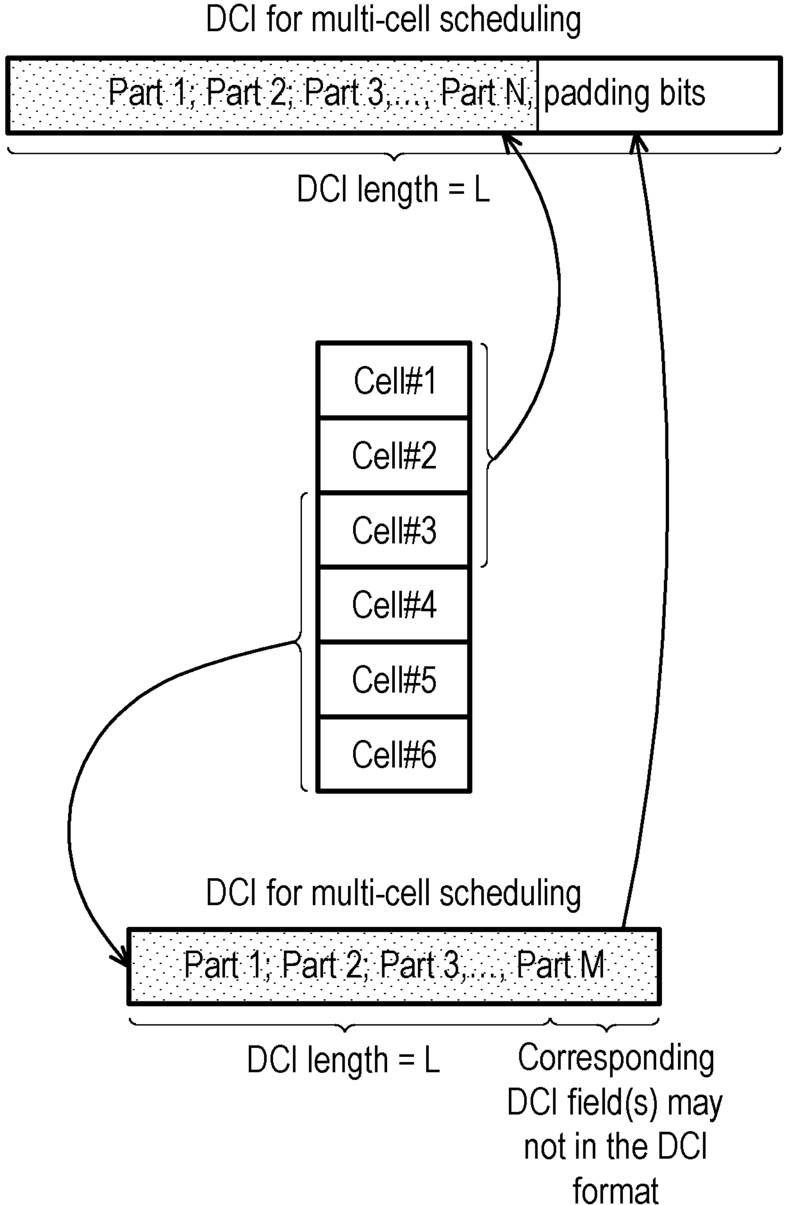
FIG. 12 is a schematic diagram that illustrates mismatched DCI lengths according to an exemplary embodiment of the present disclosure.

FIG. 12 is a schematic diagram that illustrates mismatched DCI lengths according to an exemplary embodiment of the present disclosure. Referring to FIG. 12, for example, the length of DCI is configured as L for three cells such as Cell #1~Cell #3. However, there may be different numbers of co-scheduled cells, different combinations of co-scheduled serving cells, and or different combinations of BWP size in co-scheduled cells due to BWP switching. This length may not be adapted for four cells such as Cell #3~Cell #6, and a corresponding DCI filed of Cell #6 may be not in the DCI format.

In one embodiment, a UE may apply a default value for the control information of the DCI in an event that the control information is absent from the DCI. The event is that, for example, DCI does not carry one piece of control information corresponding to a scheduled cell or has no corresponding field of the control information. The event is that, for example, DCI does not carry valid control information corresponding to a scheduled cell. Taking FIG. 12 as an example, a default value of the control information is applied for Cell #6.

In one embodiment, for a DCI field not in the DCI format (e.g., due to the limitation of DCI length), a default value/pattern or a default UE behavior (e.g., according to UE capability) may be applied. For example, a UE may apply a default value/pattern for "RV" (e.g., 0 or gNB configured value) if the indicator is not in the DCI format; apply a default value/pattern for "Antenna ports" (e.g., "00" or gNB configured value) if the indicator is not in the DCI format, apply a default value/pattern for "TPMI" (e.g., "0000") if the TPMI is not in the DCI format, assume a single antenna port transmission for a PUSCH if corresponding "TPMI" is not in the DCI format, apply a default spatial relation for a PUSCH if corresponding "SRI" is not in the DCI format, and/or apply a default spatial relation (e.g., TCI state) for a PDSCH if corresponding "TCI" is not in the DCI format.

In one embodiment, a UE may not perform one of one or more communications on one of the scheduled cells in an event that control information for one of the scheduled cells is absent from the DCI. The event is that, for example, DCI does not carry one piece of control information corresponding to a scheduled cell or has no corresponding field of the control information. Taking FIG. 12 as an example, the UE may not perform PUSCH transmission or PDSCH reception on Cell #6 when or only when a specific DCI field (e.g., TDRA, FDRA, MCS, etc.) corresponding to the Cell #6 is not in the DCI format, and/or when or only when the UE is not capable to follow the instruction without sufficient DCI.

In one embodiment, a UE may apply a quasi Co-Location (QCL) assumption for a physical downlink shared channel (PDSCH) in one or more communications based on a transmission configuration indicator (TCI) state with the lowest identification (ID) applicable for the PDSCH in an event that TCI state is absent from the DCI. The event is that, for example, DCI does not carry the TCI state or has no corresponding field of the TCI state. The event is that, for another example, the DCI has a corresponding field of the TCI state, but the field is configured as zero, null, or invalid.

In a situation where the UE receives a DCI on one serving cell, and one of one or more PDSCHs (e.g., PDSCH #1) scheduled by that DCI is performed on the same serving cell. The UE cannot obtain TCI field corresponding to the serving cell by the DCI (e.g., due to the limitation of DCI length). If the offset between the reception of the DCI and the PDSCH #1 is smaller than the threshold timeDurationForQCL, the UE may determine the PDSCH QCL assumption based on the CORESET with a CORESET ID (e.g., lowest CORESET ID). Otherwise, the UE may determine the PDSCH QCL assumption based on the CORESET transmitting the DCI that schedules the PDSCH.

In a situation where a UE receives a DCI on one serving cell, and one of the PDSCHs (e.g., PDSCH #1) scheduled by that DCI is performed on another serving cell. The UE may obtain its QCL assumption for the scheduled PDSCH (e.g., PDSCH #1) from the activated TCI state with an ID (e.g., lowest ID) applicable to PDSCH in the active BWP of the scheduled cell. The UE may be configured by a higher layer signaling to enable Default Beam for CCS (e.g., enableDefaultBeamForCCS).

Figure 13A:
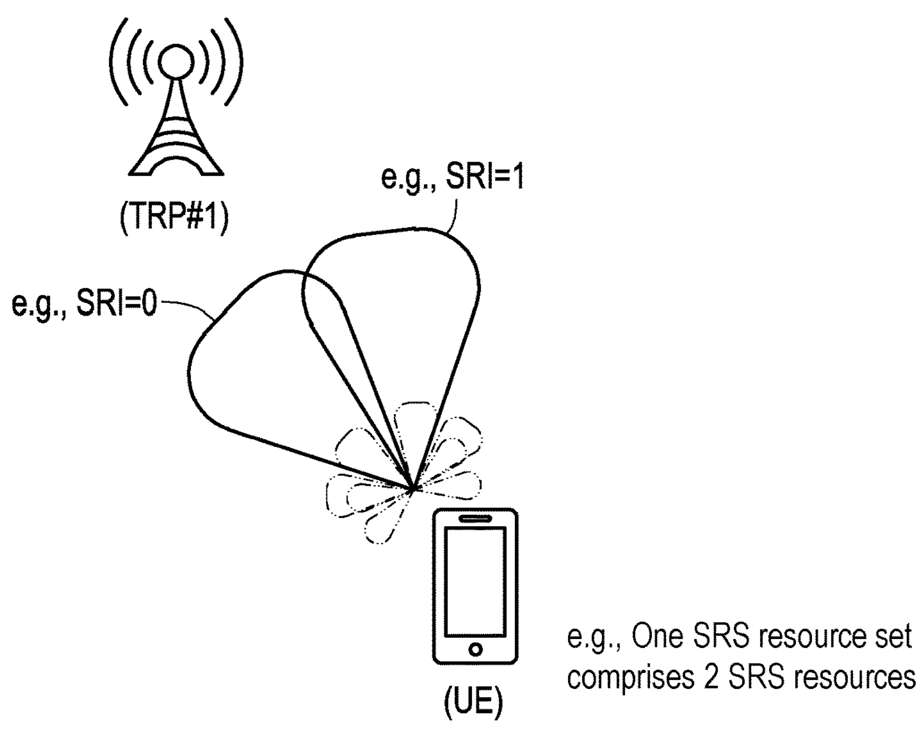
FIG. 13A is a schematic diagram that illustrates single-panel operation according to an exemplary embodiment of the present disclosure.

In one embodiment, a UE may apply a sounding reference signal (SRS) resource indicator (SRI) to one or more physical uplink shared channel (PUSCH) repetitions or to one or more PUSCHs according to one SRS resource set in an event that the SRS resource set is configured. That is one SRS resource set is configured for a serving cell, i.e., single panel. The SRI is given by the first DCI field including one SRS resource indicator and the first DCI field is in the DCI. FIG. 13A is a schematic diagram that illustrates single-panel operation according to an exemplary embodiment of the present disclosure. Referring to FIG. 13A, one SRS resource set includes 2 SRS resources which correspond to SRI=0 and SRI=1, respectively. Table (2) is a mapping table between the spatial relation of PUSCH and SRI.

TABLE 2

| SRI | Spatial relation of PUSCH |
|---|---|
| 0 | X |
| 1 | Y |

If SRI=0 is configured in the first DCI field in a DCI, the spatial relation of PUSCH transmission corresponds to the SRS resource with SRI=0 (e.g., X in the figure). If SRI=1 is configured in the first DCI field in a DCI, the spatial relation of PUSCH transmission corresponds to the SRS resource with SRI=1 (e.g., Y in the figure).

In one embodiment, a UE may apply an SRI to one or more PUSCH repetitions or to one or more PUSCHs according to one SRS resource set in an event that the SRS resource set is configured in an event an SRS resource set indicator is absent in the DCI. The event is that, for example, DCI does not carry the SRS resource set indicator or has no corresponding field of the SRS resource set indicator. The event is that, for another example, the DCI has a corresponding field of the SRS resource set indicator, but the field is configured as zero, null, or invalid.

In one embodiment, a UE may apply an SRI to one or more physical uplink shared channel (PUSCH) repetitions or to one or more PUSCHs according to the first one of multiple SRS resource sets in an event that the SRS resource sets are configured. That is multiple SRS resource sets are configured, i.e., multi-panel.

Figure 13B:
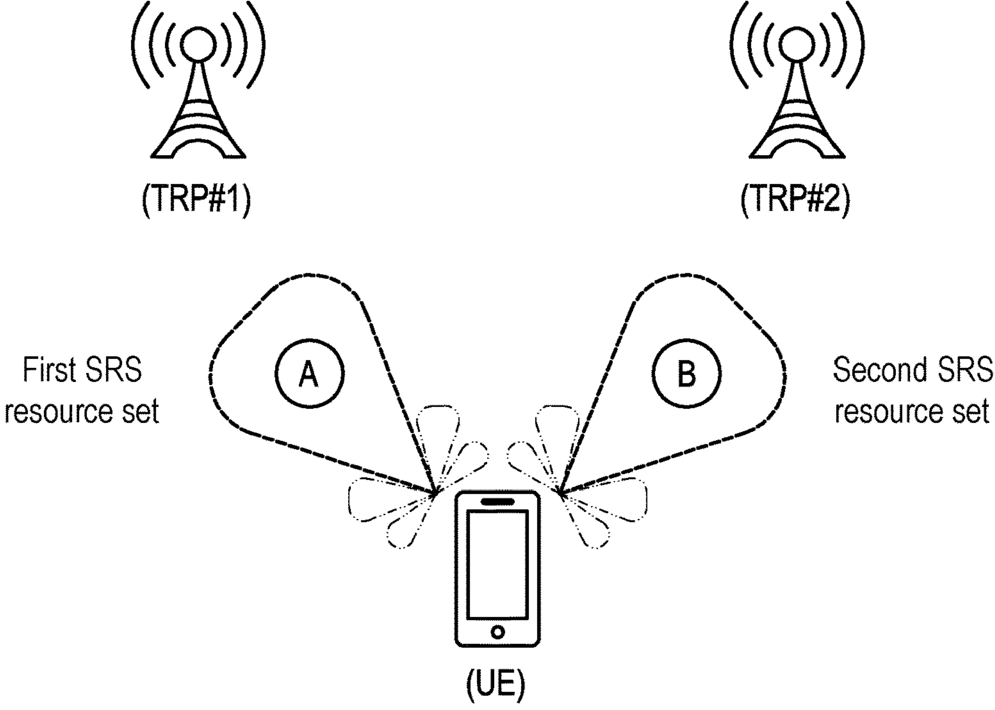
FIG. 13B is a schematic diagram that illustrates multi-panel operation according to an exemplary embodiment of the present disclosure.

For example, FIG. 13B is a schematic diagram that illustrates multi-panel operation according to an exemplary embodiment of the present disclosure. Referring to FIG. 13B, two SRS resource sets, which are the first and the second SRS resource sets, are configured for a serving cell.

Table (3) is a spatial relation of PUSCH repetition and SRS resource set indicator.

TABLE 3

| SRS resource set indicator | PUSCH repetition scheme |
|---|---|
| 00 | AAAA . . . |
| 01 | BBBB . . . |
| 10 | ABAB . . . or AABB |
| 11 | BABA . . . or BBAA |

For example, if the SRS resource set indicator="00" is indeicated in the first DCI field in a DCI, the spatial relation of PUSCH repetition corresponds to the first SRS resource set. Multiple "A" in Table (3) represent multiple continuous PUSCHs (i.e., PUSCH repetition) performed associating to the first SRS resource set. If the SRS resource set indicator="01" is indicated in the first DCI field in a DCI, the spatial relation of PUSCH repetition corresponds to the second SRS resource set. Multiple "B" in Table (3) represent multiple continuous PUSCHs (i.e., PUSCH repetition) performed associating to the second SRS resource set. However, if the SRS resource set indicator="11" is indicated in the first DCI field in a DCI, the spatial relation of PUSCH repetition corresponds to the first and the second SRS resource sets, respectively.

For each SRS resource set (e.g., A or B as shown in the figure), a UE may determine a spatial relation (e.g., X or Y) of PUSCH according to the SRI as mentioned in the aforementioned embodiment corresponding to FIG. 13A.

In one embodiment, in a case an SRS resource set indicator is absent in the DCI, UE may apply an SRI to one or more PUSCH repetitions or to one or more PUSCHs according to the first one of multiple SRS resource sets in an event that the SRS resource sets are configured. Taking FIG. 13A and FIG. 13B as an example, the SRS resource set indicator does not exist in the DCI when two SRS resource sets are configured, the PUSCH repetition or PUSCH may be performed based on SRI as shown in Table (2).

Figure 14:
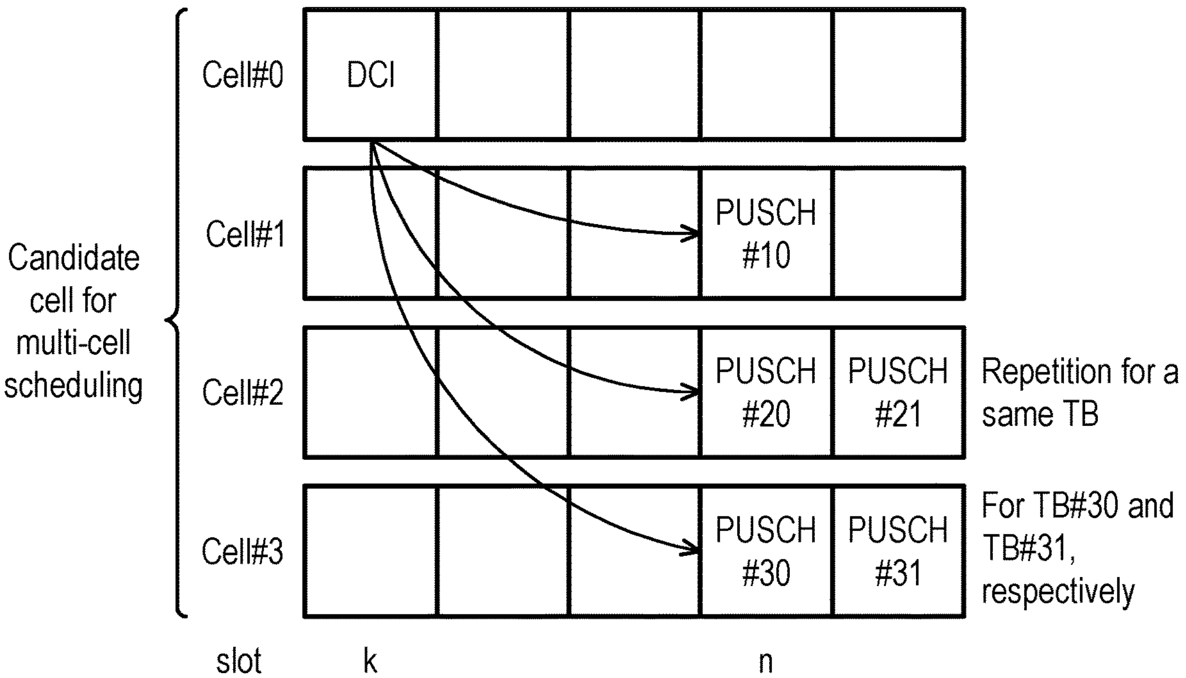
FIG. 14 is a schematic diagram that illustrates a relation determination according to an exemplary embodiment of the present disclosure.

In one embodiment, when or only when a UE is indicated by a DCI to transmit one or more PUSCHs on a serving cell, one or more PUSCHs may be one or more PUSCH repetitions for a TB. For example, FIG. 14 is a schematic diagram that illustrates a relation determination according to an exemplary embodiment of the present disclosure. Referring to FIG. 14, Cell #0~Cell #3 are the candidate cells for multi-cell scheduling. The DCI indicates PUSCH repetition with the same TB for Cell #2, such as PUSCH #20 at slot n and PUSCH #21 at slot n+1.

In one embodiment, when or only when a UE is indicated by a DCI to transmit one or more PUSCHs on a serving cell, one or more PUSCHs may correspond to one or more TBs. For example, DCI may indicate two PUSCHs with different TBs for Cell #3, such as PUSCH #30 at slot n and PUSCH #31 at slot n+1.

In one embodiment, in an event that a sounding reference signal (SRS) resource indicator (SRI) is absent in the DCI, determining a spatial relation for at least one PUSCH according to one of the following:

- a spatial relation of a reference cell or a co-scheduled serving cell;
- a pathloss reference signal (PL-RS) configured for an SRS resource set;
- a predetermined SRI associated with the SRS resource set;
- a transmission configuration indicator (TCI) state with an identification (ID) of a physical downlink shared channel (PDSCH);
- an ID of the physical uplink control channel (PUCCH);
- a quasi Co-Location (QCL) assumption; and
- an ID of the control resource set (CORESET). The event is that, for example, DCI does not carry the SRI or has no corresponding field of the SRI. The event is that, for another example, the DCI has a corresponding field of the SRI, but the field is configured as zero, null, or invalid.

In one embodiment, in a case one SRS resource set is configured for a serving cell, when a UE is indicated by a DCI to transmit one or more PUSCHs on a serving cell, the UE may determine a spatial relation for one or more PUSCH according to a spatial setting/relation of a reference/co-scheduled serving cell. The reference/co-scheduled serving cell may be configured by a network device or according to a predetermined rule (e.g., the lowest cell-ID among co-scheduled cells). The reference/co-scheduled cell may be indicated with a spatial relation via a SRI field in the DCI.

Figure 15:
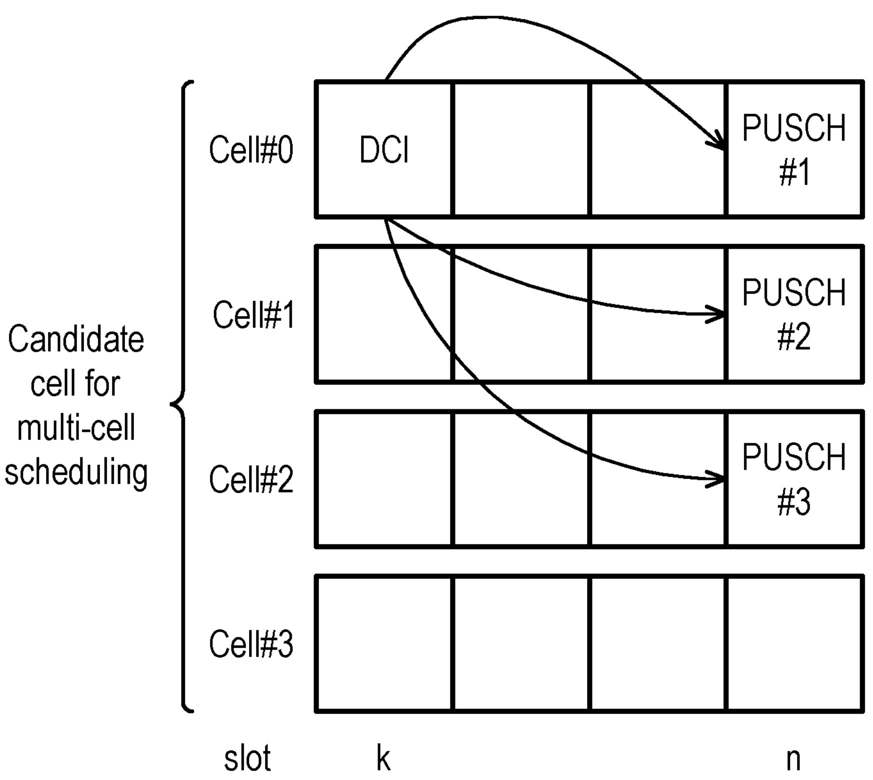
FIG. 15 is a schematic diagram that illustrates a relation determination for one sound reference signal (SRS) resource set configured for a serving cell according to an exemplary embodiment of the present disclosure.

For example, FIG. 15 is a schematic diagram that illustrates a relation determination for one sound reference signal (SRS) resource set configured for a serving cell according to an exemplary embodiment of the present disclosure. Referring to FIG. 15, the DCI includes an SRI field for PUSCH #1 in Cell #0. Cell #0 is a reference cell of Cell #1~Cell #3. UE determines a spatial relation for PUSCH #2 and PUSCH #3 according to the SRI for PUSCH #1. For example, SRI=0 is configured for PUSCH #1, and spatial relation for PUSCH #2 and PUSCH #3 would also correspond to SRI=0.

In one embodiment, in a case where one SRS resource set is configured for a serving cell, when a UE is indicated by a DCI to transmit one or more PUSCHs on a serving cell, the UE may determine a spatial relation for one or more PUSCH according to a spatial relation of a PL-RS configured for the SRS resource set, or a predetermined SRI (e.g., first) associated with the SRS resource set. For example, when there is no SRI (e.g., corresponding to the serving cell) in the DCI, when there is no reference cell for determining the spatial relation, and/or when a reference cell of the serving cell is not scheduled by the DCI, the predetermined SRI would correspond to the spatial relation for PUSCH. When a UE is indicated by a DCI to transmit one or more PUSCHs on a serving cell, the UE may not transmit one or more PUSCHs when there is no SRI (e.g., corresponding to the serving cell) in the DCI.

In one embodiment, in a case where one SRS resource set is configured for a serving cell, when a UE is indicated by a DCI to transmit one or more PUSCHs on a serving cell, the UE may determine a spatial relation for one or more PUSCH according to an active PDSCH TCI state with an ID (e.g., the lowest ID) in the active DL BWP of the serving cell. For example, when there is no SRI (e.g., corresponding to the serving cell) in the DCI, when there is no reference cell for determining the spatial relation, and/or when a reference cell of the serving cell is not scheduled by the DCI, the active PDSCH TCI state with the lowest ID in the active DL BWP would correspond to the spatial relation for PUSCH.

Figure 16:
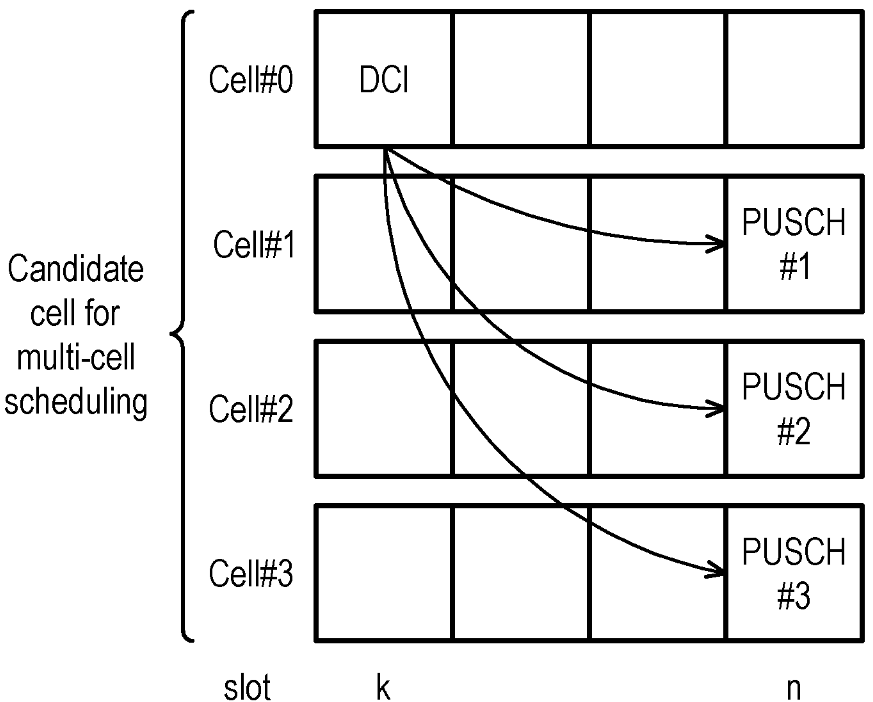
FIG. 16 is a schematic diagram that illustrates a relation determination for one SRS resource set configured for a serving cell according to an exemplary embodiment of the present disclosure.

FIG. 16 is a schematic diagram that illustrates a relation determination for one SRS resource set configured for a serving cell according to an exemplary embodiment of the present disclosure. Referring to FIG. 16, a UE may determine a spatial relation for PUSCH #1 according to an active PDSCH TCI state with the lowest ID in the active DL BWP of cell #1.

In one embodiment, in a case one SRS resource set is configured for a serving cell, when a UE is indicated by a DCI to transmit one or more PUSCHs on a serving cell, the UE may determine a spatial relation for one or more PUSCH according to a spatial setting/relation of a PUCCH with an ID (e.g., the lowest ID). For example, when there is no SRI (e.g., corresponding to the serving cell) in the DCI, when there is no reference cell for determining the spatial relation, and/or when a reference cell of the serving cell is not scheduled by the DCI, the spatial setting/relation of a PUCCH with the lowest ID would correspond to the spatial relation for PUSCH. The PUCCH may be configured in the serving cell. The PUCCH may be configured in another serving cell and configured within the same cell group (e.g., PUCCH cell group) as the serving cell.

Taking FIG. 16 as an example, a UE determines a spatial relation for PUSCH #1 according to a spatial setting/relation of a PUCCH with the lowest ID of cell #1. The cell #1 may be Pcell, PScell, PUCCH Scell, or PUCCH sScell.

In one embodiment, a UE may determine a first relation between at least one of multiple SRS resource sets and one or more PUSCH repetitions or a second relation between at least one of the SRS resource sets and one or more PUSCHs according to an SRS resource set indicator in the DCI in an event that multiple SRS resource sets are configured. The UE may transmit one or more PUSCH repetitions according to the first relation between at least one of the SRS resource sets and one or more PUSCH repetitions or transmit one or more PUSCHs according to the second relation between at least one of the SRS resource sets and one or more PUSCHs. For example, when two SRS resource sets are configured for a serving cell, a (e.g., multi-cell) scheduling DCI may indicate the following transmission scheme with less DCI overhead:

scheme 0; multi-TRP operation scheme 1: SRS resource set selection (panel selection),
- there is a (e.g., 1-bit) SRS resource set indicator corresponding to the serving cell in the DCI,
- e.g., panel selection for single-TRP operation;

scheme 2: dynamic single/multi-TRP operation (e.g., for a transport block),
- there is No SRS resource set indicator corresponding to the serving cell in the DCI, e.g., single-TRP/multi-TRP operation.

In one embodiment, in scheme 0, a UE is indicated by a DCI to transmit one or more PUSCHs on a serving cell, and there is an SRS resource set indicator (e.g., with 2-bit) corresponding to the serving cell in the DCI. For example, if the DCI indicates codepoint “00” for the SRS resource set indicator, the first SRS resource set may be associated with one or more PUSCHs. If the DCI indicates codepoint “01” for the SRS resource set indicator, the second SRS resource set may be associated with one or more PUSCHs. If the DCI indicates codepoint “10” for the SRS resource set indicator, the first and second SRS resource sets are applied to the first and second (if any) PUSCH repetition, respectively, and the same SRS resource set mapping pattern continues to the remaining PUSCH repetition, if any. If the DCI indicates codepoint “11” for the SRS resource set indicator, the second and first SRS resource sets are applied to the first and second (if any) PUSCH repetition, respectively, and the same SRS resource set mapping pattern continues to the remaining PUSCH repetition, if any.

In one embodiment, in scheme 0, a UE is indicated by a DCI to transmit one or more PUSCHs on a serving cell, and there is an SRS resource set indicator (e.g., with 1-bit) corresponding to the serving cell in the DCI. For example, if the DCI indicates codepoint “0” for the SRS resource set indicator, the first and second SRS resource sets are applied to the first and second (if any) PUSCH repetition, respectively, and the same SRS resource set mapping pattern continues to the remaining PUSCH repetition, if any. If the DCI indicates codepoint “1” for the SRS resource set indicator, the second and first SRS resource sets are applied to the first and second (if any) PUSCH repetition, respectively, and the same SRS resource set mapping pattern continues to the remaining PUSCH repetition, if any.

Figure 17:
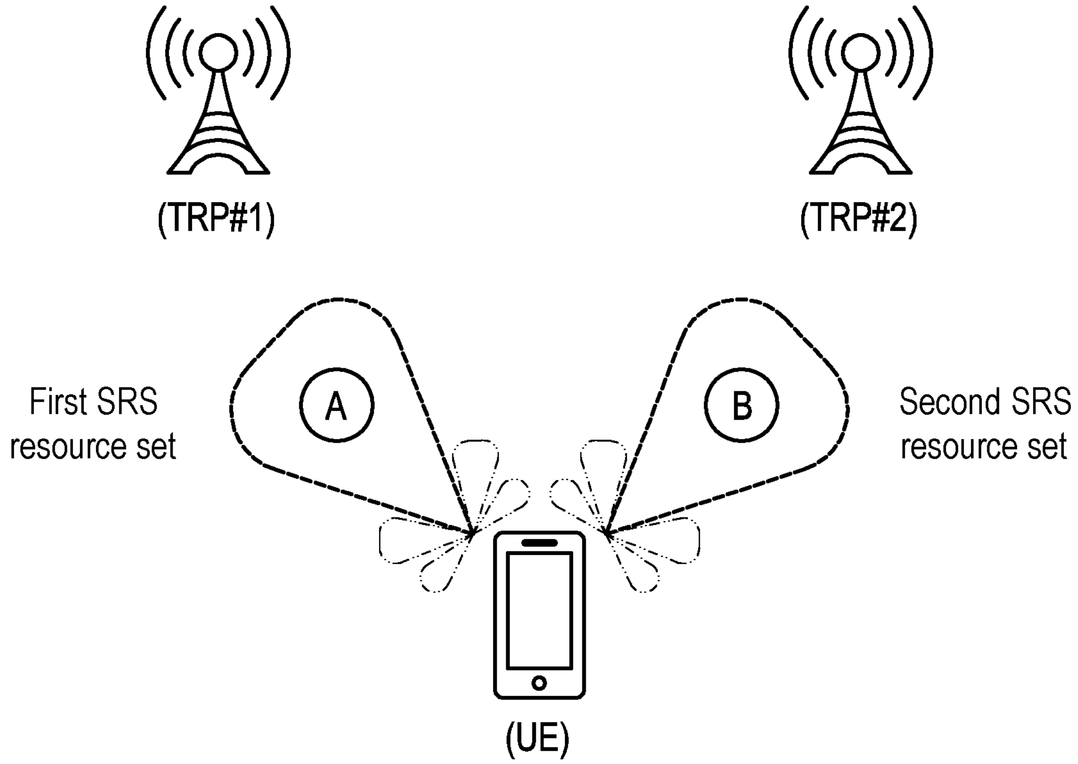
FIG. 17 is a schematic diagram that illustrates a relation determination for multi-panel operation according to an exemplary embodiment of the present disclosure.

For example, FIG. 17 is a schematic diagram that illustrates a relation determination for multi-panel operation according to an exemplary embodiment of the present disclosure. Referring to FIG. 17, Table (4) is a mapping table between the SRS resource set indicator and PUSCH repetition scheme. If the SRS resource set indicator is configured with codepoint “0”, the PUSCH repetition pattern would be “AB” or “AABB”. If the SRS resource set indicator is configured with codepoint “1”, the PUSCH repetition pattern would be “BA” or “BBAA”.

TABLE 4

| SRS resource set indicator | PUSCH repetition scheme |
|---|---|
| 0 | ABAB . . . or AABB . . . |
| 1 | BABA . . . or BBAA . . . |

In one embodiment, in scheme 0, a UE is indicated by a DCI to transmit one or more PUSCHs on a serving cell, and there is an SRS resource set indicator corresponding to the serving cell in the DCI. The UE may determine one or more spatial relations for one or more PUSCH according to two SRIs for the serving cell in the DCI, where the first SRI may be associated with the first SRS resource set indicated in the DCI, and the second SRI may be associated with the second SRS resource set indicated in the DCI.

In one embodiment, in an event that an SRI is absent in the DCI, a UE may determine a spatial relation for the at least one PUSCH according to one of the following:
- a predetermined SRI associated with one of the SRS resource sets;
- a pathloss reference signal (PL-RS) configured for one of the SRS resource sets;

a transmission configuration indicator (TCI) state with an identification (ID) of a physical downlink shared channel (PDSCH);

an ID of physical uplink control channel (PUCCH); and a quasi Co-Location (QCL) assumption or a value of control resource set (CORESET).

For example, if there is no SRI for the serving cell in the DCI, for a spatial relation applied for the first SRS resource set, a predetermined SRI (e.g., first SRI) may associate with the first SRS resource set, and/or a spatial relation of a PL-RS configured for the first SRS resource set may be applied. Furthermore, for a spatial relation applied for the second SRS resource set, a predetermined SRI (e.g., second SRI) may associate with the second SRS resource set, and/or a spatial relation of a PL-RS configured for the second SRS resource set may be applied.

For example, if there is no SRI for the serving cell in the DCI, a UE may determine at least one spatial relation for one or more PUSCHs according to an active PDSCH TCI state with an ID (e.g., lowest ID) and with 2 TCI states in the active DL BWP of the serving cell, e.g., the first and second TCI states of the PDSCH TCI state ID are corresponding to the spatial relation of first and second SRS resource set, respectively.

For example, if there is no SRI for the serving cell in the DCI, a UE may determine at least one spatial relation for one or more PUSCHs according to a spatial setting/relation of a PUCCH with an ID (e.g., the lowest ID), e.g., a spatial setting/relation with a lower or higher ID configured for the PUCCH is corresponding to the spatial relation of first and second SRS resource set, respectively.

For example, if there is no SRI for the serving cell in the DCI, a UE may determine at least one spatial relation for one or more PUSCHs according to a (e.g., type D) QCL assumption or a spatial relation of a CORESET with an ID (e.g., the lowest ID), e.g., the first or second TCI state configured for the CORESET are corresponding to the spatial relation of first and second SRS resource set, respectively; the TCI state configured for the CORESET of a first CORESET pool index is corresponding to the spatial relation of first SRS resource set, and the TCI state configured for the CORESET of a second CORESET pool index is corresponding to the spatial relation of second SRS resource set.

For example, if there is no SRI for the serving cell in the DCI, a UE may determine at least one spatial relation for one or more PUSCHs applied for the first SRS resource set according to one SRI for the serving cell in the DCI associated with the first SRS resource set. For another example, if there is no SRI for the serving cell in the DCI, a UE may determine at least one spatial relation for one or more PUSCHs applied for the second SRS resource set according to a predetermined SRI (e.g., the first) associated with the second SRS resource set, a spatial relation of a PL-RS configured for the second SRS resource set, an active PDSCH TCI state with an ID (e.g., the lowest ID) and with 2 TCI states in the active DL BWP of the serving cell, a spatial setting/relation of a PUCCH with an ID (e.g., the lowest ID), and/or a (e.g., type D) QCL assumption or a spatial relation of a CORESET with an ID (e.g., the lowest ID).

Figure 18:
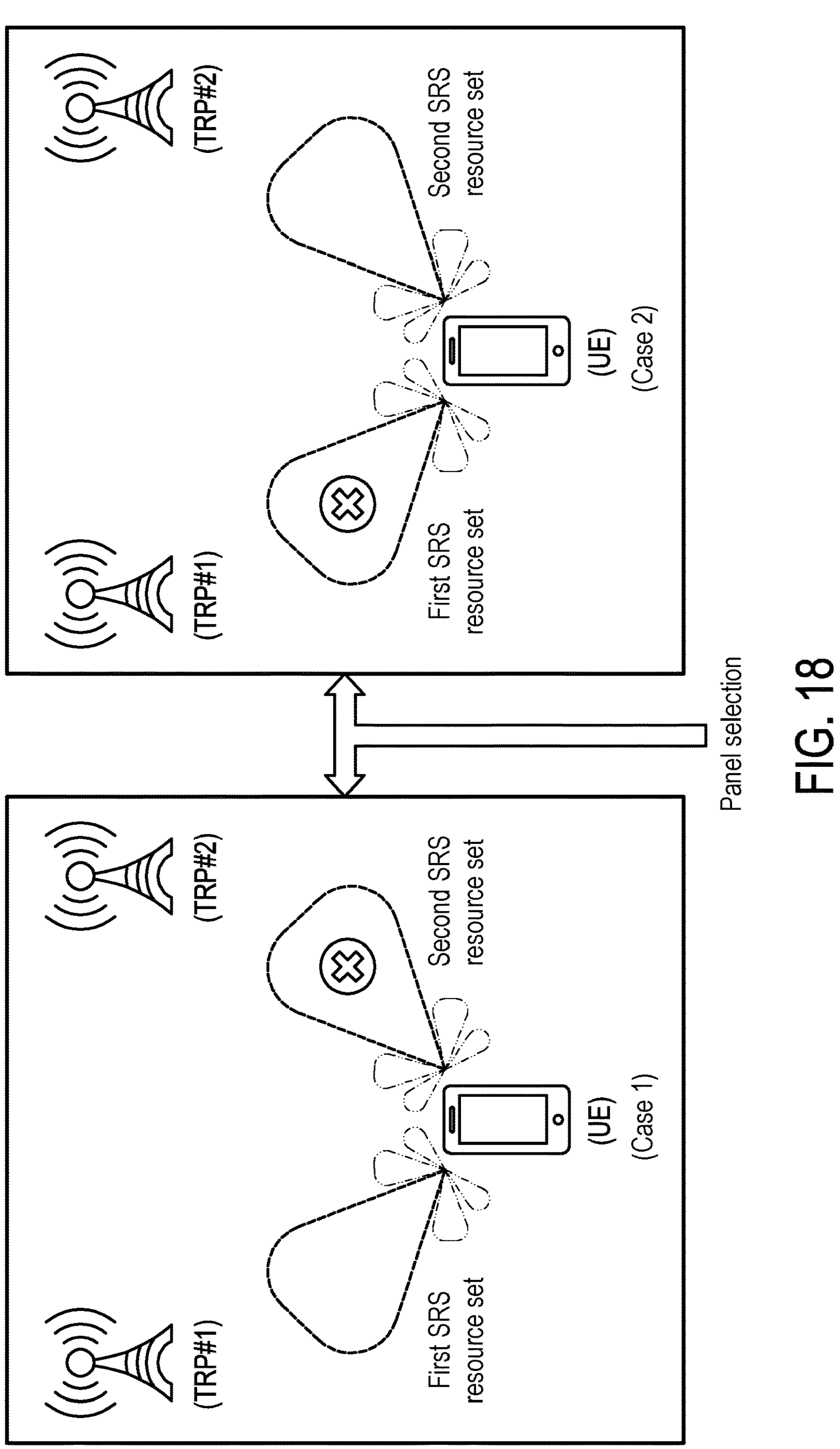
FIG. 18 is a schematic diagram that illustrates a panel selection according to an exemplary embodiment of the present disclosure.

FIG. 18 is a schematic diagram that illustrates a panel selection according to an exemplary embodiment of the present disclosure. Referring to FIG. 18, in scheme 1, a UE is indicated by a DCI to transmit at least one or more PUSCHs on a serving cell, and there is an SRS resource set indicator (e.g., with 1-bit) corresponding to the serving cell in the DCI. If the DCI indicates codepoint "0" for the SRS resource set indicator, the first SRS resource set may be associated with one or more PUSCHs (e.g., Case 1 in the figure). If the DCI indicates codepoint "1" for the SRS resource set indicator, the second SRS resource set may be associated with one or more PUSCHs (e.g., Case 2 in the figure).

In one embodiment, in scheme 1, a UE is indicated by a DCI to transmit at least one or more PUSCHs on a serving cell, and there is an SRS resource set indicator (e.g., with 1-bit) corresponding to the serving cell in the DCI. The UE may determine one or more spatial relations for one or more PUSCHs according to one or more SRI fields in the DCI. One SRI field may correspond to the serving cell. The UE may apply the indicated SRI to one or more PUSCHs according to the associated SRS resource set as indicated by the SRS resource set indicator. The serving cell may be a reference serving cell (e.g., configured by a network device or according to the cell ID) for determining an SRI for all or a sub-group of candidate serving cells. For any serving cell within the candidate cell for multi-cell scheduling (or for any cell within the same sub-group), the UE may determine a spatial relation according to the reference cell and the SRI.

Figure 19:
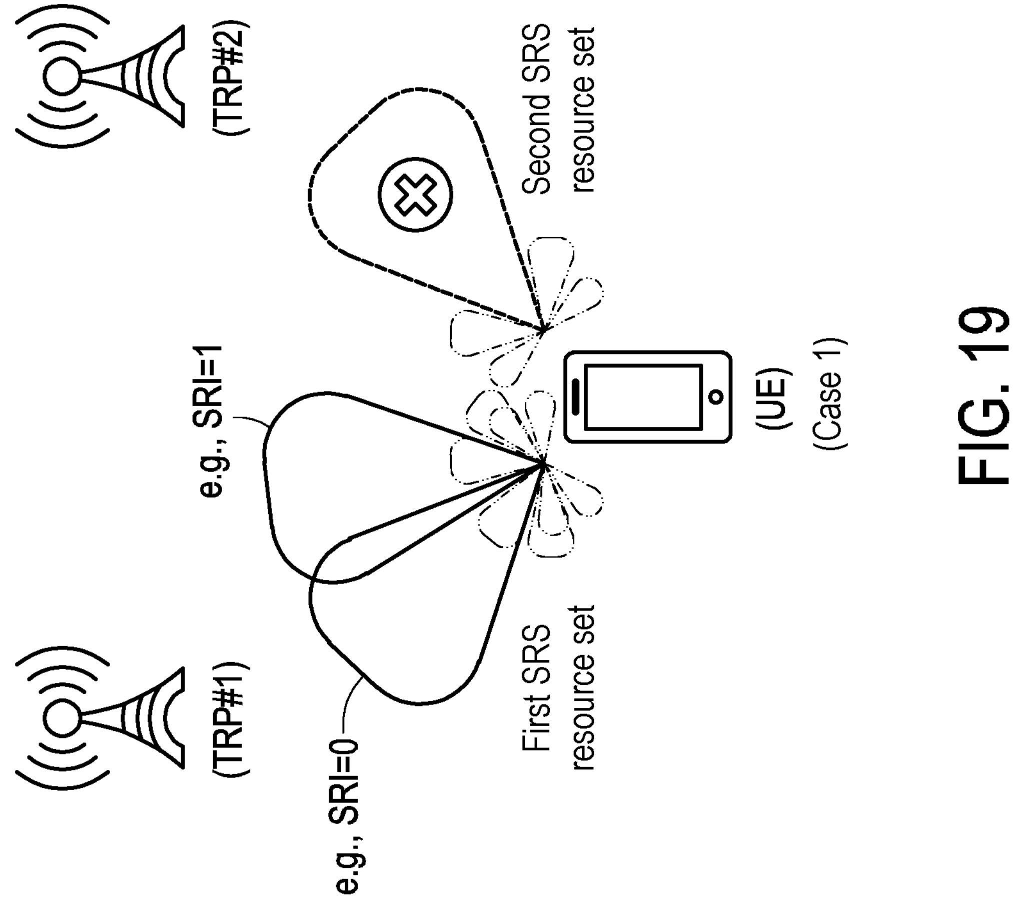
FIG. 19 is a schematic diagram that illustrates a relation determination for multi-panel operation according to an exemplary embodiment of the present disclosure.

For example, FIG. 19 is a schematic diagram that illustrates a relation determination for multi-panel operation according to an exemplary embodiment of the present disclosure. Referring to FIG. 19, the SRS resource set indicator corresponding to the first SRS resource set is configured in a DCI provided by TRP #1. The UE may further check an SRI field corresponding to a severing cell provided by TRP #1, and perform the PUSCH transmission according to the SRI field (e.g., SRI="0") corresponding to the serving cell.

In one embodiment, in scheme 1, a UE is indicated by a DCI to transmit at least one or more PUSCHs on a serving cell, and there is an SRS resource set indicator (e.g., with 1-bit) corresponding to the serving cell in the DCI. In an event that an SRI is absent in the DCI, the UE may determine one or more spatial relations for one or more PUSCHs according to one of the following:

a spatial setting/relation of a reference/co-scheduled serving cell, e.g., an SRI (according to the SRS resource set indicator) for the reference cell; an active PDSCH TCI state with an ID (e.g., the lowest ID) in the active DL BWP of the serving cell, e.g., a first or second TCI state (according to the SRS resource set indicator) of the PDSCH TCI state ID;

a spatial setting/relation of a PUCCH with an ID (e.g., the lowest ID), e.g., a spatial setting/relation of a PUCCH with an ID (e.g., the lowest ID); and a (e.g., type D) QCL assumption or a spatial relation of a CORESET with an ID (e.g., the lowest ID), e.g., a first or second TCI state (according to the SRS resource set indicator) of the PDSCH TCI state ID. The UE may assume one or more PUSCHs are scheduled with a single layer (single antenna port) transmission.

In one embodiment, in scheme 1, a UE is indicated by a DCI to transmit at least one or more PUSCHs on a serving cell, and there is an SRS resource set indicator (e.g., with 1-bit) corresponding to the serving cell in the DCI. The UE may determine one or more spatial relations for one or more PUSCHs according to a spatial relation of a PL_RS configured for the SRS resource set indicated by the SRS resource set indicator or an active PDSCH TCI state with an ID (e.g., the lowest ID) and with 2 TCI states in the active SL BWP of the serving cell (e.g., the first and second TCI states of the PDSCH TCI state ID are corresponding to the spatial relation of first and second SRS resource sets, respectively). The UE may assume one or more PUSCHs are scheduled with a single layer (single antenna port) transmission.

For example, when there is no SRI (e.g., corresponding to the serving cell) in the DCI, when there is no reference cell for determining the spatial relation, and/or when a reference cell of the serving cell is not scheduled by the DCI, a UE may determine the spatial relation of PUSCH as the PL_RS configured for the indicated SRS resource set in the DCI or an active PSCH TCI state with the lowest ID and 2 TCI states.

In scheme 2, a UE is indicated by DCI to transmit one or more PUSCHs on a serving cell, and the DCI may dynamically indicate single TRP or multi-TRP transmission for one or more PUSCHs. In one embodiment, a UE may determine a spatial relation for one or more PUSCHs according to one or more demodulation reference signal (DMRS) ports indicated by an antenna port field in the DCI.

Figure 20:
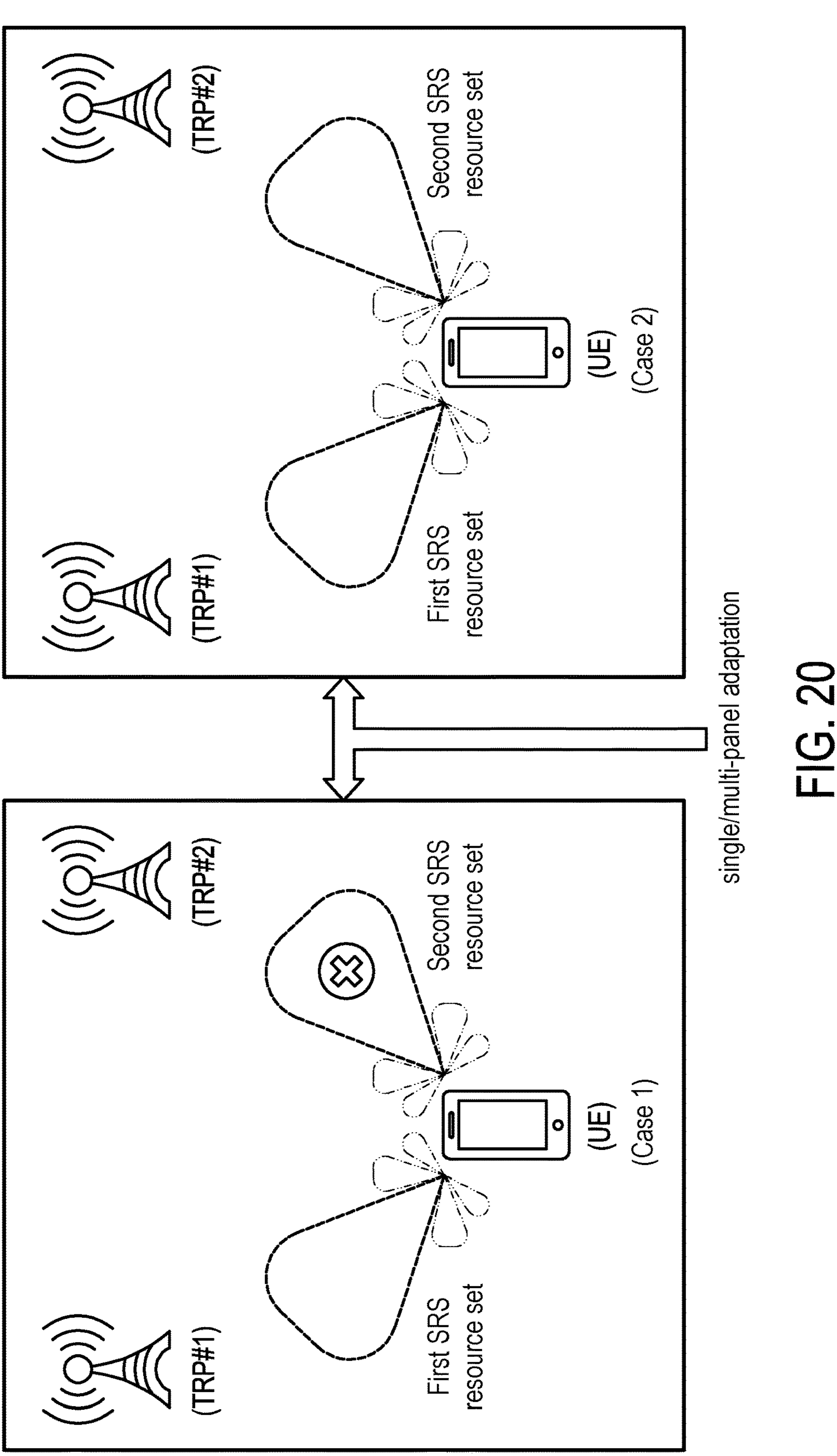
FIG. 20 is a schematic diagram that illustrates a dynamic single/multi-panel operation according to an exemplary embodiment of the present disclosure.

For example, FIG. 20 is a schematic diagram that illustrates a dynamic single/multi-panel operation according to an exemplary embodiment of the present disclosure. Referring to FIG. 20, in Case 1, a DCI field in the DCI indicates a DMRS port corresponding to the first SRS resource set, the UE may perform PUSCH transmission on the first SRS resource set. In Case 2, a DCI field in the DCI indicate DMRS ports corresponding to the first and second SRS resource sets, the UE may perform PUSCH transmissions on the first and second SRS resource sets.

In one embodiment, multiple DMRS ports include two DMRS ports multiplexed in one or more symbol DMRS in a code division manner, and each DMRS port is associated with a DMRS code division multiplexing (CDM) group.

Figure 21:
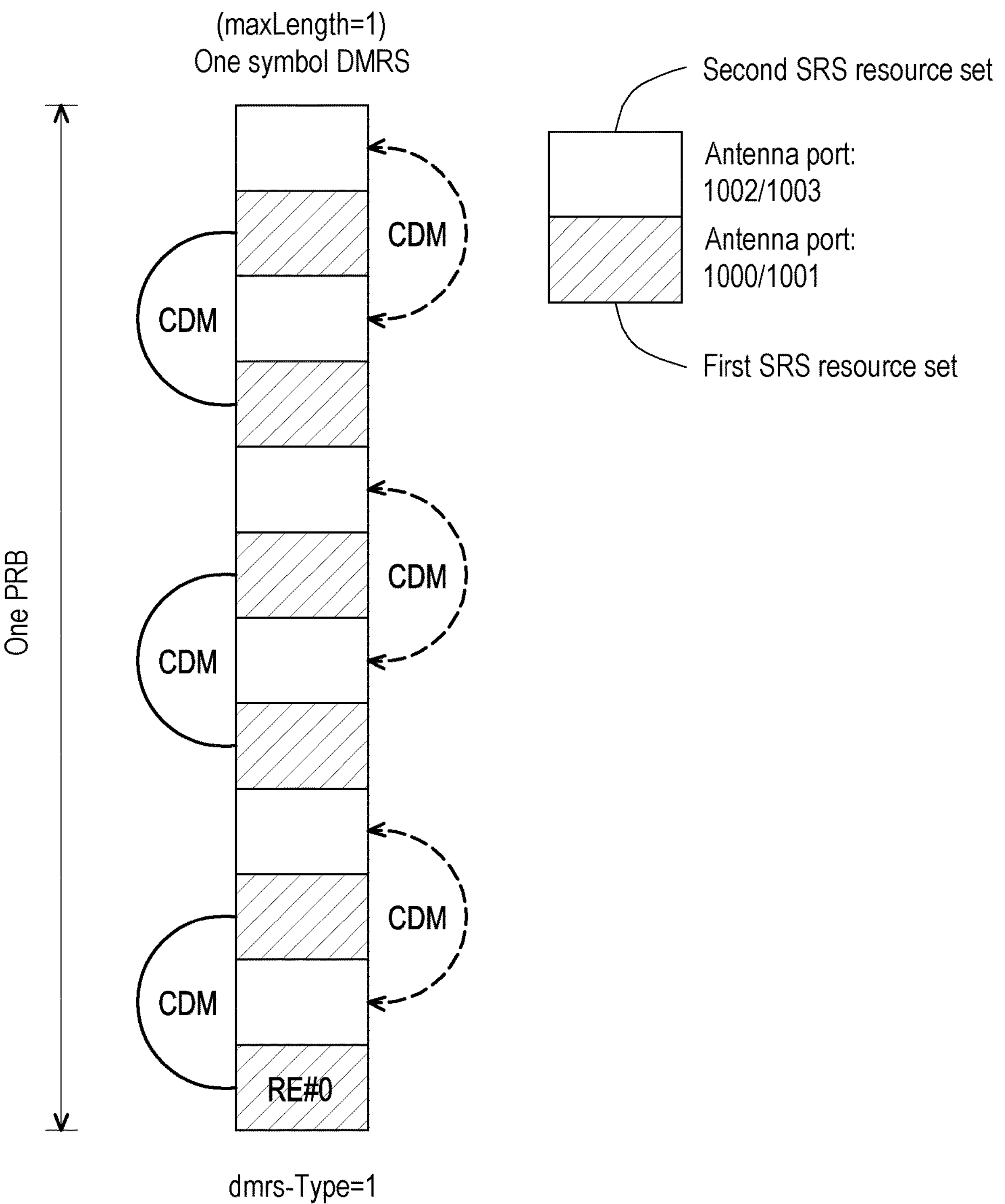
FIG. 21 is a schematic diagram that illustrates an association of demodulation reference signals (DMRS) port and code division multiplexing (CDM) group according to an exemplary embodiment of the present disclosure.

For example, FIG. 21 is a schematic diagram that illustrates an association of demodulation reference signals (DMRS) port and code division multiplexing (CDM) group according to an exemplary embodiment of the present disclosure. Referring to FIG. 21, antenna port 1000/1001 corresponds to the first SRS resource set, and antenna port 1002/1003 corresponds to the second SRS resource set. In one symbol DMRS and one PRB, two DMRS ports are multiplexed in the code division manner.

Table (5) is a mapping table between DMRS port(s) and SRS resource set where the transform precoder is disabled, dmrs-Type=1, maxLength=1, and rank=1.

TABLE 5

| Value | Number of DMRS CDM group(s) without data | DMRS port(s) | SRS resource set |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 2 |
| 5 | 2 | 3 | 2 |
| 6-7 | Reserved | Reserved | Reserved |

Table (6) is a mapping table between DMRS port(s) and SRS resource set where the transform precoder is disabled, dmrs-Type=1, maxLength=1, and rank=2.

TABLE 6

| Value | Number of DMRS CDM group(s) without data | DMRS port(s) | SRS resource set |
|---|---|---|---|
| 0 | 1 | 0, 1 | 1 |
| 1 | 2 | 0, 1 | 1 |
| 2 | 2 | 2, 3 | 2 |
| 3 | 2 | 0, 2 | 1, 2 |
| 4-7 | Reserved | Reserved | Reserved |

Table (7) is a mapping table between DMRS port(s) and SRS resource set which is default as multi-panel where the transform precoder is disabled, dmrs-Type=1, maxLength=1, and rank=3.

TABLE 7

| Value | Number of DMRS CDM group(s) without data | DMRS port(s) | SRS resource set |
|---|---|---|---|
| 0 | 2 | 0-2 | 1, 2 |
| 1-7 | Reserved | Reserved | Reserved |

Table (8) is a mapping table between DMRS port(s) and SRS resource set which is default as multi-panel where the transform precoder is disabled, dmrs-Type=1, maxLength=1, and rank=4.

TABLE 8

| Value | Number of DMRS CDM group(s) without data | DMRS port(s) | SRS resource set |
|---|---|---|---|
| 0 | 2 | 0-3 | 1, 2 |
| 1-7 | Reserved | Reserved | Reserved |

Table (9) is a mapping table between DMRS port(s) and SRS resource set for single/multi-panel operation where the transform precoder is disabled, dmrs-Type=1, maxLength=1, and rank=3.

TABLE 9

| Value | Number of DMRS CDM group(s) without data | DMRS port(s) | SRS resource set |
|---|---|---|---|
| 0 | 2 | 0-2 | 1, 2 |
| 1 | 2 | 0-2 | 1 |
| 2 | 2 | 0-2 | 2 |
| 3-7 | Reserved | Reserved | Reserved |

Table (10) is a mapping table between DMRS port(s) and SRS resource set for single/multi-panel operation where the transform precoder is disabled, dmrs-Type=1, maxLength=1, and rank=4.

TABLE 10

| Value | Number of DMRS CDM group(s) without data | DMRS port(s) | SRS resource set |
|---|---|---|---|
| 0 | 2 | 0-3 | 1, 2 |
| 1 | 2 | 0-3 | 1 |
| 2 | 2 | 0-3 | 2 |
| 3-7 | Reserved | Reserved | Reserved |

Figure 22:
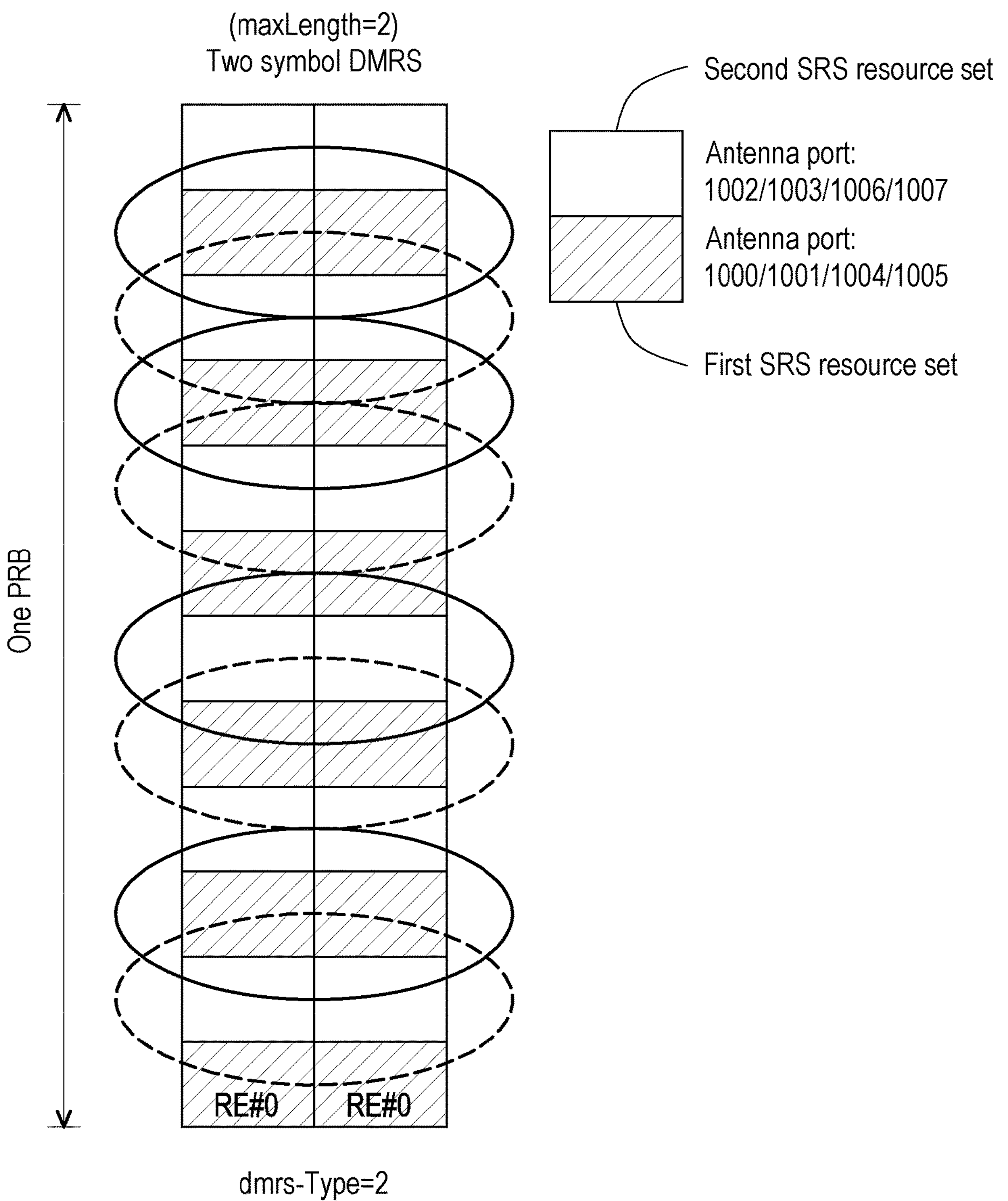
FIG. 22 is a schematic diagram that illustrates an association of DMRS port and CDM group according to an exemplary embodiment of the present disclosure.

FIG. 22 is a schematic diagram that illustrates an association of DMRS port and CDM group according to an exemplary embodiment of the present disclosure. Referring to FIG. 22, antenna port 1000/1001/1004/1005 corresponds to the first SRS resource set, and antenna port 1002/1003/1006/1007 corresponds to the second SRS resource set. In two symbol DMRSs and one PRB, two DMRS ports are multiplexed in the code division manner.

Table (11) is a mapping table between DMRS port(s) and SRS resource set where the transform precoder is disabled, dmrs-Type=1, maxLength=2, and rank=1.

TABLE 11

| Value | Number of DMRS CDM group(s) without data | DMRS port(s) | Number of front-load symbols | SRS resource set |
|---|---|---|---|---|
| 0 | 1 | 0 | 1 | 1 |
| 1 | 1 | 1 | 1 | 1 |
| 2 | 2 | 0 | 1 | 1 |
| 3 | 2 | 1 | 1 | 1 |
| 4 | 2 | 2 | 1 | 2 |
| 5 | 2 | 3 | 1 | 2 |
| 6 | 2 | 0 | 2 | 1 |
| 7 | 2 | 1 | 2 | 1 |
| 8 | 2 | 2 | 2 | 2 |
| 9 | 2 | 3 | 2 | 2 |
| 10 | 2 | 4 | 2 | 1 |
| 11 | 2 | 5 | 2 | 1 |
| 12 | 2 | 6 | 2 | 2 |
| 13 | 2 | 7 | 2 | 2 |
| 14-15 | Reserved | Reserved | Reserved | Reserved |

Table (12) is a mapping table between DMRS port(s) and SRS resource set where the transform precoder is disabled, dmrs-Type=1, maxLength=2, and rank=2.

TABLE 12

| Value | Number of DMRS CDM group(s) without data | DMRS port(s) | Number of front-load symbols | SRS resource set |
|---|---|---|---|---|
| 0 | 1 | 0, 1 | 1 | 1 |
| 1 | 2 | 0, 1 | 1 | 1 |
| 2 | 2 | 2, 3 | 1 | 2 |
| 3 | 2 | 0, 2 | 1 | 1, 2 |
| 4 | 2 | 0, 1 | 2 | 1 |
| 5 | 2 | 2, 3 | 2 | 1 |
| 6 | 2 | 4, 5 | 2 | 1 |
| 7 | 2 | 6, 7 | 2 | 2 |
| 8 | 2 | 0, 4 | 2 | 1 |
| 9 | 2 | 2, 6 | 2 | 2 |
| 10-15 | Reserved | Reserved | Reserved | Reserved |

Table (13) is a mapping table between DMRS port(s) and SRS resource set where the transform precoder is disabled, dmrs-Type=1, maxLength=2, and rank=3.

TABLE 13

| Value | Number of DMRS CDM group(s) without data | DMRS port(s) | Number of front-load symbols | SRS resource set |
|---|---|---|---|---|
| 0 | 2 | 0-2 | 1 | 1, 2 |
| 1 | 2 | 0, 1, 4 | 2 | 1 |
| 2 | 2 | 2, 3, 6 | 2 | 2 |
| 3-15 | Reserved | Reserved | Reserved | Reserved |

Table (14) is a mapping table between DMRS port(s) and SRS resource set where the transform precoder is disabled, dmrs-Type=1, maxLength=2, and rank=4.

TABLE 14

| Value | Number of DMRS CDM group(s) without data | DMRS port(s) | Number of front-load symbols | SRS resource set |
|---|---|---|---|---|
| 0 | 2 | 0-3 | 1 | 1, 2 |
| 1 | 2 | 0, 1, 4, 5 | 2 | 1 |
| 2 | 2 | 2, 3, 6, 7 | 2 | 2 |
| 3 | 2 | 0, 2, 4, 6 | 2 | 1, 2 |
| 4-15 | Reserved | Reserved | Reserved | Reserved |

In one embodiment, in scheme 2, a UE is indicated by DCI to transmit one or more PUSCHs on a serving cell, and the DCI may dynamically indicate single TRP or multi-TRP transmission for one or more PUSCHs. The UE may determine a spatial relation for one or more PUSCHs according to two SRIs for the serving cell in the DCI. The two SRIs include the first SRI and the second SRI. The first SRI may be associated with the first SRS resource set indicated in the DCI. The second SRI may be associated with the second SRS resource set indicated in the DCI. Taking FIG. 19 as an example, SRI="0" and SRI="1" are configured in the DCI, and the PUSCH transmission is performed on the SRS resource corresponding to the SRI.

In one embodiment, in scheme 2, a UE is indicated by DCI to transmit one or more PUSCHs on a serving cell, and the DCI may dynamically indicate single TRP or multi-TRP transmission for one or more PUSCHs. In an event that an SRI is absent (e.g., no SRI) in the DCI, the UE may determine a spatial relation for one or more PUSCHs applied for the first SRS resource set according to a predetermined SRI (e.g., first) associated with the first SRS resource set and/or a spatial relation of a PL-RS configured for the first SRS resource set.

In one embodiment, in scheme 2, a UE is indicated by DCI to transmit one or more PUSCHs on a serving cell, and the DCI may dynamically indicate single TRP or multi-TRP transmission for one or more PUSCHs. In an event that an SRI is absent (e.g., no SRI) in the DCI, the UE may determine a spatial relation for one or more PUSCHs applied for the second SRS resource set according to a predetermined SRI (e.g., second) associated with the second SRS resource set and/or a spatial relation of a PL-RS configured for the second SRS resource set.

In one embodiment, in scheme 2, a UE is indicated by DCI to transmit one or more PUSCHs on a serving cell, and the DCI may dynamically indicate single TRP or multi-TRP transmission for one or more PUSCHs. In an event that an SRI is absent (e.g., no SRI) in the DCI, the UE may determine a spatial relation for one or more PUSCHs according to at least one of the following:

- an active PDSCH TCI state with an ID (e.g., the lowest ID) and with 2 TCI states in the active DL BWP of the serving cell,
  - e.g., the first and second TCI states of the PDSCH TCI state ID correspond to the spatial relation of the first and second SRS resource set, respectively;
- a spatial setting/relation of a PUCCH with an ID (e.g., the lowest ID),
  - e.g., a spatial setting/relation with a lower or higher ID configured for the PUCCH corresponds to the spatial relation of the first and second SRS resource set, respectively; a (e.g., type D) QCL assumption or spatial relation of a CORESET with an ID (e.g., the lowest ID), e.g., the first or second TCI state configured for the CORESET corresponds to the spatial relation of the first and second SRS resource set, respectively, e.g., the TCI state configured for the CORESET of a first CORESET pool index corresponds to the spatial relation of the first SRS resource set, and the TCI state configured for the CORESET of a second CORESET pool index corresponds to the spatial relation of the second SRS resource set.

In one embodiment, in scheme 2, a UE is indicated by DCI to transmit one or more PUSCHs on a serving cell, and the DCI may dynamically indicate single TRP or multi-TRP transmission for one or more PUSCHs. The UE may apply a sounding reference signal (SRS) resource indicator (SRI) to one or more physical uplink shared channel (PUSCH) repetitions or to one or more PUSCHs according to one SRS resource set in an event that multiple SRS resource sets are configured. That is one SRS resource set is utilized for transmitting one or more physical uplink shared channel (PUSCH) repetitions or transmitting one or more PUSCHs, i.e., single panel UL transmission. The SRI is given by the first DCI field including one SRS resource indicator and the first DCI field is in the DCI. The UE may determine a spatial relation for one or more PUSCHs applied for the first SRS resource set according to one SRI for the serving cell in the DCI associated with the first SRS resource set.

In one embodiment, in scheme 2, a UE is indicated by DCI to transmit one or more PUSCHs on a serving cell, and the DCI may dynamically indicate single TRP or multi-TRP transmission for one or more PUSCHs. The UE may apply an SRI to one or more PUSCH repetitions or to one or more PUSCHs according to one SRS resource set in an event that two SRS resource sets are configured and in an event an SRS resource set indicator is absent in the DCI. The event is that, for example, DCI does not carry the SRS resource set indicator or has no corresponding field of the SRS resource set indicator. The event is that, for another example, the DCI has a corresponding field of the SRS resource set indicator, but the field is configured as zero, null, or invalid.

In one embodiment, in scheme 2, a UE is indicated by DCI to transmit one or more PUSCHs on a serving cell, and the DCI may dynamically indicate single TRP or multi-TRP transmission for one or more PUSCHs. The UE may determine a spatial relation for one or more PUSCHs applied for the second SRS resource set according to at least one of the following:

a predetermined SRI (e.g., first) associated with the second SRS resource set;

a spatial relation of a PL-RS configured for the 2nd SRS resource set;

an active PDSCH TCI state with an ID (e.g., the lowest ID) and with 2 TCI states in the active DL BWP of the serving cell;

a spatial setting/relation of a PUCCH with an ID (e.g., the lowest ID);

a (e.g., type D) QCL assumption or spatial relation of a CORESET with an ID (e.g., the lowest ID).

Figure 23:
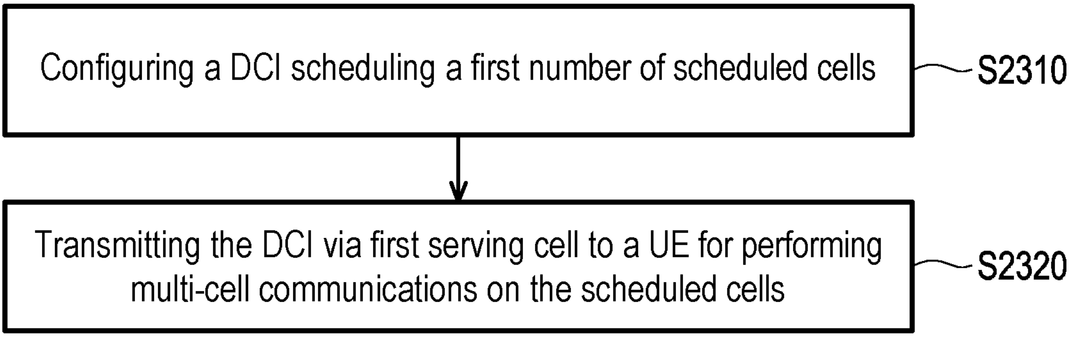
FIG. 23 is a flow chart that illustrates a method for handling a multi-cell scheduling according to an exemplary embodiment of the present disclosure.

FIG. 23 is a flow chart that illustrates a method for handling a multi-cell scheduling according to an exemplary embodiment of the present disclosure. Referring to FIG. 23, the method is adapted for a network device. The network device configures a DCI scheduling a first number of multiple scheduled cells (Step S2310). The network device transmits the DCI via a first serving cell to a UE for performing multiple multi-cell communications on the scheduled cells (Step S2320). The DCI includes one or more single DCI fields, one or more separate DCI fields, and one or more configurable DCI fields. The multi-cell communication is receiving PDSCH or transmitting PUSCH on multiple cells.

In one embodiment, the single DCI field corresponds to the at least one of the first number of the plurality of scheduled cells.

In one embodiment, the single DCI field comprises at least one of:

an identifier for DCI format;

a co-scheduled cells indicator;

a bandwidth part (BWP) indicator for the plurality of scheduled cells that support dynamic BWP switching;

a downlink assignment index;

a transmission power control (TPC) command for a physical uplink control channel (PUCCH);

a PUCCH resource indicator;

a physical downlink shared channel-to-hybrid automatic repeat request (PDSCH-to-HARQ) timing indicator;

a one-shot HARQ-ACK request;

a beta offset indicator;

a channel state information (CSI) request; and a time domain resource allocation (TDRA).

In one embodiment, the separate DCI field corresponds to a second number of information blocks, and each information block indicates control information for one of the plurality of scheduled cells.

In one embodiment, the second number of information blocks are placed according to an ascending order of a serving cell index, and the first information block corresponds to the smallest serving cell index. In one embodiment, the second number equals to the first number.

In one embodiment, the second number equals the first number.

In one embodiment, the control information corresponds to one of following:

a new data indicator (NDI);

a redundancy version (RV);

a modulation coding scheme (MCS); and a frequency domain resource assignment (FDRA).

In one embodiment, a network device may configure each configurable DCI field corresponding to the first number of scheduled cells in an event that the configurable DCI field is a first type, and the network device configures each configurable DCI field including multiple information blocks in which each information block corresponds to the first number in an event that the configurable DCI field is a second type. For example, RRC signaling includes information indicating the type of the configurable DCI field.

In one embodiment, the configurable DCI field comprises at least one of:

a rate matching indicator;

a zero power (ZP) channel state information-reference signal (CSI-RS) trigger;

precoding information and number of layers;

a phase-tracking reference signal-demodulation reference signal (PTRS-DMRS) association;

an antenna port;

a transmission configuration indicator (TCI);

a sounding reference signal (SRS) request;

a DMRS sequence initialization;

an SRS resource indicator (SRI); and a physical reference block (PRB) bundling size indicator.

In one embodiment, a network device may configure the length of information blocks in the separate DCI field or in the configurable DCI field to be the same, and/or the network device may configure the length of information block in the separate DCI field or in the configurable DCI field according to at least one higher layer signaling.

In one embodiment, the DCI is configured in a UE-specific search space (USS) and a length of the DCI is determined according to at least one higher layer configuration.

In one embodiment, the DCI is scrambled by a cell-radio network temporary identity (C-RNTI) and the length of the DCI is not equal to the length of the first DCI with a different format scrambled by the C-RNTI.

In one embodiment, a network device may transmit a sounding reference signal (SRS) resource indicator (SRI), where the SRI is given by a first DCI field including one SRS resource indicator in the DCI.

In one embodiment, an SRS resource set indicator is absent in the DCI.

Figure 24:
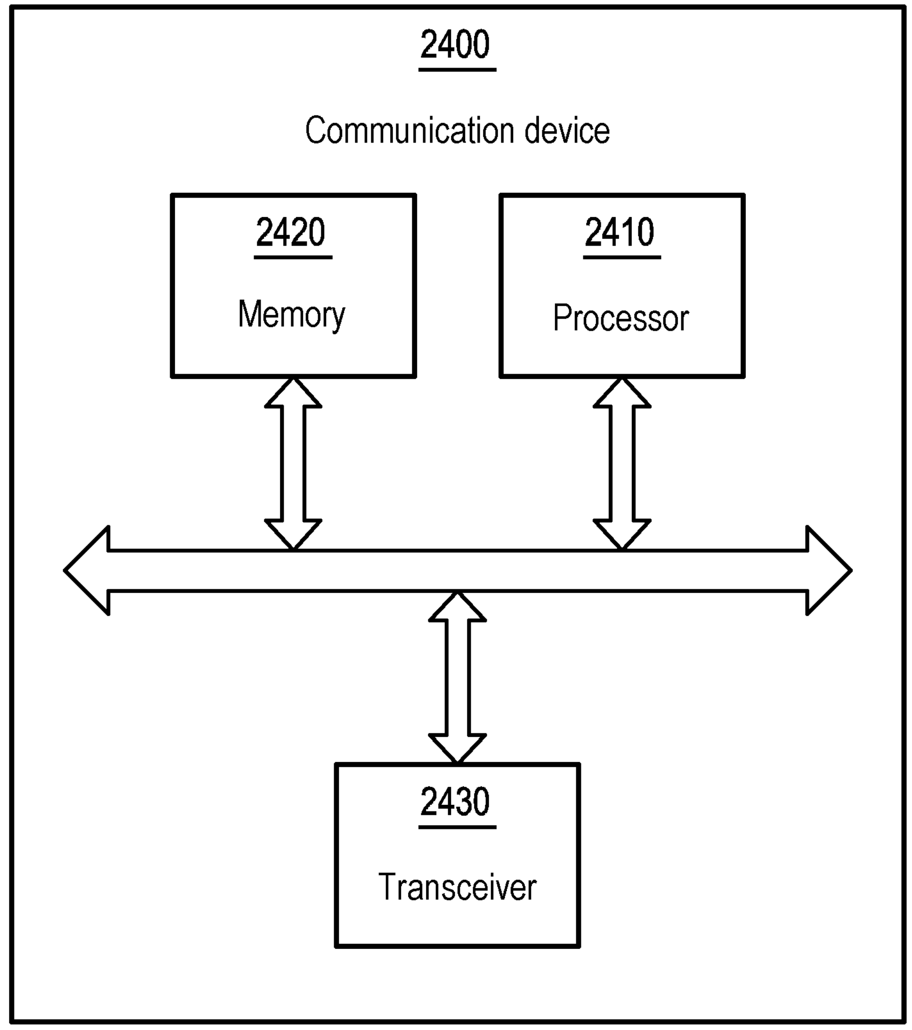
FIG. 24 is a block diagram that illustrates a communication device according to an exemplary embodiment of the present disclosure.

FIG. 24 is a block diagram that illustrates a communication device according to an exemplary embodiment of the present disclosure. Referring to FIG. 24, the communication device 2400 may be a UE or a network device. The communication device 2400 may include, but is not limited thereto a processor 2410. The processor 2410 (e.g., having processing circuitry) may include an intelligent hardware device, e.g., a Central Processing Unit (CPU), a microcontroller, an ASIC, etc. The processor 2410 can call and run a computer program from memory to implement the method in the embodiment of the disclosure.

Since the program code stored in the communication device 2400 adopts all the technical solutions of all the foregoing embodiments when being executed by the processor 2410, it at least has all the advantageous effects brought by all the technical solutions of all the foregoing embodiments, and no further description is incorporated herein.

Optionally, as shown in FIG. 24, the communication device 2400 may further include a memory 2420. The memory 2420 may include computer-storage media in the form of volatile and/or non-volatile memory. The memory 2420 may be removable, non-removable, or a combination thereof. Exemplary memory includes solid-state memory, hard drives, optical-disc drives, etc. The processor 2410 may call and run a computer program from the memory 2420 to implement the method in the embodiment of the disclosure.

The memory 2420 may be a separate device independent of the processor 2410, or may be integrated in the processor 2410.

Optionally, as shown in FIG. 24, the communication device 2400 may further include a transceiver 2430, and the processor 2410 may control the transceiver 2430 to communicate with other devices. The transceiver 2430 having a transmitter (e.g., transmitting/transmission circuitry) and a receiver (e.g., receiving/reception circuitry) may be configured to transmit and/or receive time and/or frequency resource partitioning information. In some implementations, the transceiver 2430 may be configured to transmit in different types of subframes and slots including, but not limited to, usable, non-usable and flexibly usable subframes and slot formats. The transceiver 2430 may be configured to receive data and control channels.

Specifically, the transceiver 2430 may send information or data to other devices, or receive information or data sent by other devices.

Specifically, the transceiver 2430 may include a transmitter and a receiver. The transceiver 2430 may further include an antenna, and the number of antennas may be one or more.

Optionally, the communication device 2400 may specifically be a network device in an embodiment of the disclosure, and the communication device 2400 may implement the corresponding process implemented by the network device in various methods of the embodiment of the disclosure. For the conciseness, related descriptions are omitted.

Optionally, the communication device 2400 may specifically be a mobile terminal, a terminal device, or a UE in an embodiment of the disclosure, and the communication device 2400 may implement the corresponding process implemented by the mobile terminal, the terminal device, or the UE in various methods in the embodiment of the disclosure. For conciseness, related description is omitted.

In summary, in the method for handling a multi-cell scheduling and a UE of the embodiments of the disclosure, a new type of DCI Field supporting of multi-panel operation for multi-cell scheduling is defined.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for handling a multi-cell scheduling used by a user equipment (UE), the method comprising:

receiving a downlink control information (DCI) from a first serving cell;

determining a first number of a plurality of scheduled cells according to the DCI, wherein the DCI is configured to schedule at least one communication on the plurality of scheduled cells;

performing the at least one communication on at least one of the first number of the plurality of scheduled cells according to the DCI, wherein the DCI comprises at least one single DCI field, at least one separate DCI field and at least one configurable DCI field;

applying a sounding reference signal (SRS) resource indicator (SRI) to at least one physical uplink shared channel (PUSCH) repetition or to at least one PUSCH according to first one of a plurality of SRS resource sets in an event that the plurality of SRS resource sets are configured, wherein the SRI is given by a first DCI field including one SRS resource indicator in the DCI, and an SRS resource set indicator is absent in the DCI;

applying a default value of corresponding DCI field for one of the plurality of scheduled cells in an event that the DCI does not carry valid control information corresponding to the one of the plurality of scheduled cells; and applying a value of the valid control information for one of the plurality of scheduled cells in an event that the DCI carries the valid control information corresponding to the one of the plurality of scheduled cells.

2. The method according to claim 1, wherein the single DCI field corresponds to the at least one of the first number of the plurality of scheduled cells.

3. The method according to claim 2, wherein the single DCI field comprises at least one of:

an identifier for DCI format;

a co-scheduled cells indicator;

a bandwidth part (BWP) indicator for the plurality of scheduled cells that support dynamic BWP switching;

a downlink assignment index;

a transmission power control (TPC) command for a physical uplink control channel (PUCCH);

a PUCCH resource indicator;
a physical downlink shared channel-to-hybrid automatic repeat request (PDSCH-to-HARQ) timing indicator;
a one-shot HARQ-ACK request;
a beta offset indicator;
a channel state information (CSI) request; and
a time domain resource allocation (TDRA).

4. The method according to claim 1, wherein the separate DCI field corresponds to a second number of information blocks, and each of the information blocks indicates control information for one of the plurality of scheduled cells.

5. The method according to claim 4,
wherein the second number of information blocks are placed according to an ascending order of a serving cell index, and a first information block corresponds to a smallest serving cell index; and
wherein the second number equals to the first number.

6. The method according to claim 4, wherein the control information corresponds to one of following:
a new data indicator (NDI);
a redundancy version (RV);
a modulation coding scheme (MCS); and
a frequency domain resource assignment (FDRA).

7. The method according to claim 1, further comprising:
determining one of the at least one configurable DCI field corresponding to the first number of the plurality of scheduled cells in an event that the configurable DCI field is a first type; and
determining one of the at least one configurable DCI field comprising a plurality of information blocks in which each of the information blocks corresponds to a subgroup or one of the first number of the plurality of scheduled cells in an event that the configurable DCI field is a second type.

8. The method according to claim 7, wherein the configurable DCI field comprises at least one of:
a rate matching indicator;
a zero power (ZP) channel state information-reference signal (CSI-RS) trigger;
precoding information and number of layers;
a phase-tracking reference signal-demodulation reference signal (PTRS-DMRS) association;
an antenna port;
a transmission configuration indicator (TCI);
a sounding reference signal (SRS) request;
a DMRS sequence initialization;
an SRS resource indicator (SRI); and
a physical reference block (PRB) bundling size indicator.

9. The method according to claim 1, further comprising:
applying one of the configurable DCI field to the plurality of scheduled cells in an event that type information is absent from one of the configurable DCI field, wherein the type information indicates one of the configurable DCI field as one of the single DCI field or one of the separate DCI field.

10. The method according to claim 1, wherein
determining one of the configurable DCI field corresponding to a second number of information blocks in an event that type information is absent from one of the configurable DCI field, wherein the type information indicates one of the configurable DCI field as one of the single DCI field or one of the separate DCI field.

11. The method according to claim 1, further comprising:
determining a length of information blocks in the separate DCI field or in the configurable DCI field to be the same, or
determining a length of information block in the separate DCI field or in the configurable DCI field according to at least one higher layer signaling.

12. The method according to claim 1, further comprising:
not performing one of the at least one communication on one of the plurality of scheduled cells in an event that control information for one of the plurality of scheduled cells is absent from the DCI.

13. The method according to claim 1, further comprising:
applying a quasi Co-Location (QCL) assumption for a physical downlink shared channel (PDSCH) in the plurality of communications based on a transmission configuration indicator (TCI) state with a lowest identification (ID) applicable for the PDSCH in an event that TCI state is absent from the DCI.

14. The method according to claim 1, wherein the step of determining the first number of the plurality of scheduled cells according to the DCI further comprises:
determining the first number of the plurality of scheduled cells from a third number of the plurality of scheduled cells, wherein the first number is less than or equals to the third number, and a maximum number of the third number of serving cell is 4 and/or a minimum number of the first number of serving cell is 1.

15. The method according to claim 1, wherein the DCI is configured in a UE-specific search space (USS) and a length of the DCI is determined according to at least one higher layer configuration.

16. The method according to claim 1, wherein the DCI is scrambled by a cell-radio network temporary identity (C-RNTI) and a length of the DCI is not equal to a length of first DCI with a different format scrambled by the C-RNTI.

17. The method according to claim 1, further comprising:
determining a first relation between at least one of a plurality of SRS resource sets and at least one physical uplink shared channel (PUSCH) repetition or a second relation between the at least one of the plurality of SRS resource sets and at least one PUSCH according to an SRS resource set indicator in the DCI in an event that the plurality of SRS resource sets are configured; and
transmitting the at least one PUSCH repetition according to the first relation between the at least one of plurality of SRS resource sets and the at least one PUSCH repetition or transmitting the at least one PUSCH according to the second relation between the at least one of the plurality of SRS resource sets and the at least one PUSCH.

18. The method according to claim 17, wherein the step of determining the second relation between the at least one of the plurality of SRS resource sets and the at least one PUSCH further comprises:
in an event that a sounding reference signal (SRS) resource indicator (SRI) is absent in the DCI, determining a spatial relation for the at least one PUSCH according to one of following:
a predetermined SRI associated to one of the plurality of SRS resource sets;
a pathloss reference signal (PL-RS) configured for one of the plurality of SRS resource sets;
a transmission configuration indicator (TCI) state with an identification (ID) of a physical downlink shared channel (PDSCH);
an ID of physical uplink control channel (PUCCH); and
a quasi Co-Location (QCL) assumption or a value of control resource set (CORESET).

19. The method according to claim 17, wherein the step of determining the second relation between the at least one of the plurality of SRS resource sets and the at least one PUSCH further comprises:

determining a spatial relation for the at least one PUSCH according to at least one SRI field in the DCI.

20. The method according to claim 17, further comprising:

determining a spatial relation for the at least one PUSCH according to at least one demodulation reference signal (DMRS) port indicated by an antenna port field in the DCI.

21. The method according to claim 1, further comprising:

in an event that a sounding reference signal (SRS) resource indicator (SRI) is absent in the DCI, determining a spatial relation for at least one PUSCH according to one of following:

a spatial relation of a reference cell or a co-scheduled serving cell;

a pathloss reference signal (PL-RS) configured for an SRS resource set;

a predetermined SRI associated with the SRS resource set;

a transmission configuration indicator (TCI) state with an identification (ID) of a physical downlink shared channel (PDSCH);

an ID of physical uplink control channel (PUCCH);

a quasi Co-Location (QCL) assumption; and an ID of control resource set (CORESET).

22. A user equipment (UE), comprising:

a transceiver, used for transmitting or receiving signals;

a memory, used for storing a program code; and a processor, coupled to the transceiver and the memory, and configured for executing the program code to:

receive, through the transceiver, a downlink control information (DCI) from a first serving cell;

determine a first number of a plurality of scheduled cells according to the DCI, wherein the DCI is configured to schedule at least one communication on the plurality of scheduled cells;

perform the at least one communication on at least one of the first number of the plurality of scheduled cells according to the DCI, wherein the DCI comprises at least one single DCI field, at least one separate DCI field and at least one configurable DCI field;

apply a sounding reference signal (SRS) resource indicator (SRI) to at least one physical uplink shared channel (PUSCH) repetition or to at least one PUSCH according to first one of a plurality of SRS resource sets in an event that the plurality of SRS resource sets are configured, wherein the SRI is given by a first DCI field including one SRS resource indicator in the DCI, and an SRS resource set indicator is absent in the DCI;

apply a default value of corresponding DCI field for one of the plurality of scheduled cells in an event that the DCI does not carry valid control information corresponding to the one of the plurality of scheduled cells; and apply a value of the valid control information for one of the plurality of scheduled cells in an event that the DCI carries the valid control information corresponding to the one of the plurality of scheduled cells.

23. The UE according to claim 22, wherein the single DCI field corresponds to the at least one of the first number of the plurality of scheduled cells.

24. The UE according to claim 23, wherein the at least one single DCI field comprises at least one of:

an identifier for DCI format;

a co-scheduled cells indicator;

a bandwidth part (BWP) indicator for the plurality of scheduled cells that support dynamic BWP switching;

a downlink assignment index;

a transmission power control (TPC) command for a physical uplink control channel (PUCCH);

a PUCCH resource indicator;

a physical downlink shared channel-to-hybrid automatic repeat request (PDSCH-to-HARQ) timing indicator;

a one-shot HARQ-ACK request;

a beta offset indicator;

a channel state information (CSI) request; and a time domain resource allocation (TDRA).

25. The UE according to claim 22, wherein the separate DCI field corresponds to a second number of information blocks, and each of the information blocks indicates control information for one of the plurality of scheduled cells.

26. The UE according to claim 25, wherein the second number of information blocks are placed according to an ascending order of a serving cell index, and a first information block corresponds to a smallest serving cell index; and wherein the second number equals to the first number.

27. The UE according to claim 25, wherein the control information corresponds to one of following:

a new data indicator (NDI);

a redundancy version (RV);

a modulation coding scheme (MCS); and a frequency domain resource assignment (FDRA).

28. The UE according to claim 22, wherein the processor is further configured to:

determine each of the at least one configurable DCI field corresponding to the first number of the plurality of scheduled cells in an event that the configurable DCI field is a first type; and determine each of the at least one configurable DCI field comprising a plurality of information blocks in which each of the information blocks corresponds to a subgroup or one of the first number of the plurality of scheduled cells an event that the configurable DCI field is a second type.

29. The UE according to claim 28, wherein the configurable DCI field comprises at least one of:

a rate matching indicator;

a zero power (ZP) channel state information-reference signal (CSI-RS) trigger;

precoding information and number of layers;

a phase-tracking reference signal-demodulation reference signal (PTRS-DMRS) association;

an antenna port;

a transmission configuration indicator (TCI);

a sounding reference signal (SRS) request;

a DMRS sequence initialization;

an SRS resource indicator (SRI); and a physical reference block (PRB) bundling size indicator.

30. The UE according to claim 22, wherein the processor is further configured to:

applying the configurable DCI field to the plurality of scheduled cells in an event that type information is absent from the configurable DCI field, wherein the type information indicates one of the configurable DCI field as one of the single DCI field or one of the separate DCI field.

31. The UE according to claim 22, wherein the processor is further configured to:

determine the configurable DCI field corresponding to a second number of information blocks in an event that type information is absent from the configurable DCI field, wherein the type information indicates one of the configurable DCI field as one of the single DCI field or one of the separate DCI field.

32. The UE according to claim 22, wherein the processor is further configured to:

determine a length of information blocks in the separate DCI field or in the configurable DCI field to be the same, or determine a length of information block in the separate DCI field or in the configurable DCI field according to at least one higher layer signaling.

33. The UE according to claim 22, wherein the processor is further configured to:

not perform one of the at least one communication on one of the plurality of scheduled cells in an event that control information for one of the plurality of scheduled cells is absent from the DCI.

34. The UE according to claim 22, wherein the processor is further configured to:

apply a quasi Co-Location (QCL) assumption for a physical downlink shared channel (PDSCH) in the plurality of communications based on a transmission configuration indicator (TCI) state with a lowest identification (ID) applicable for the PDSCH in an event that TCI state is absent from the DCI.

35. The UE according to claim 22, wherein the processor is further configured to:

determine the first number of the plurality of scheduled cells from a third number of the plurality of scheduled cells, wherein the first number is less than or equals to the third number, and a maximum number of the third number of serving cell is 4 and/or a minimum number of the first number of serving cell is 1.

36. The UE according to claim 22, wherein the DCI is configured in a UE-specific search space (USS) and a length of the DCI is determined according to at least one higher layer configuration.

37. The UE according to claim 22, wherein the DCI is scrambled by a cell-radio network temporary identity (C-RNTI) and a length of the DCI is not equal to a length of first DCI with a different format scrambled by the C-RNTI.

38. The UE according to claim 22, wherein the processor is further configured to:

determine a first relation between at least one of a plurality of SRS resource sets and at least one physical uplink shared channel (PUSCH) repetition or a second relation between the at least one of the plurality of SRS resource sets and at least one PUSCH according to an SRS resource set indicator in the DCI in an event that the plurality of SRS resource sets are configured; and transmit, through the transceiver, the at least one PUSCH repetition according to the first relation between the at least one of plurality of SRS resource sets and the at least one PUSCH repetition or transmitting the at least one PUSCH according to the second relation between the at least one of the plurality of SRS resource sets and the at least one PUSCH.

39. The UE according to claim 38, wherein the processor is further configured to:

in an event that a sounding reference signal (SRS) resource indicator (SRI) is absent in the DCI, determine a spatial relation for the at least one PUSCH according to one of following:

a predetermined SRI associated to one of the plurality of SRS resource sets;

a pathloss reference signal (PL-RS) configured for one of the plurality of SRS resource sets;

a transmission configuration indicator (TCI) state with an identification (ID) of a physical downlink shared channel (PDSCH);

an ID of physical uplink control channel (PUCCH); and a quasi Co-Location (QCL) assumption or a value of control resource set (CORESET).

40. The UE according to claim 38, wherein the processor is further configured to:

determine a spatial relation for the at least one PUSCH according to at least one SRI field in the DCI.

41. The UE according to claim 38, wherein the processor is further configured to:

determine a spatial relation for the at least one PUSCH according to at least one demodulation reference signal (DMRS) port indicated by an antenna port field in the DCI.

42. The UE according to claim 22, wherein the processor is further configured to:

in an event that a sounding reference signal (SRS) resource indicator (SRI) is absent in the DCI, determine a spatial relation for at least one PUSCH according to one of following:

a spatial relation of a reference cell or a co-scheduled serving cell;

a pathloss reference signal (PL-RS) configured for an SRS resource set;

a predetermined SRI associated with the SRS resource set;

a transmission configuration indicator (TCI) state with an identification (ID) of a physical downlink shared channel (PDSCH);

an ID of physical uplink control channel (PUCCH);

a quasi Co-Location (QCL) assumption; and an ID of control resource set (CORESET).

43. A method for handling a multi-cell scheduling used by a network device, the method comprising:

configuring a downlink control information (DCI) scheduling a first number of a plurality of scheduled cells;

transmitting the DCI via a first serving cell to a user equipment (UE) for performing a plurality of communications on the plurality of scheduled cells, wherein the DCI comprises at least one single DCI field, at least one separate DCI field and at least one configurable DCI field;

transmitting a sounding reference signal (SRS) resource indicator (SRI), wherein the SRI is configured to at least one physical uplink shared channel (PUSCH) repetition or to at least one PUSCH according to first one of a plurality of SRS resource sets in an event that the plurality of SRS resource sets are configured, and the SRI is given by a first DCI field including one SRS resource indicator in the DCI, an SRS resource set indicator is absent in the DCI, a default value of corresponding DCI field is configured to be applied to one of the plurality of scheduled cells in an event that the DCI does not carry valid control information corresponding to the one of the plurality of scheduled cells; and a value of the valid control information is configured to be applied to one of the plurality of scheduled cells in an event that the DCI carries the valid control information corresponding to the one of the plurality of scheduled cells.

44. The method according to claim 43, wherein the single DCI field corresponds to the at least one of the first number of the plurality of scheduled cells.

45. The method according to claim 44, wherein the single DCI field comprises at least one of:

an identifier for DCI format;

a co-scheduled cells indicator;

a bandwidth part (BWP) indicator for the plurality of scheduled cells that support dynamic BWP switching;

a downlink assignment index;

a transmission power control (TPC) command for a physical uplink control channel (PUCCH);

a PUCCH resource indicator;

a physical downlink shared channel-to-hybrid automatic repeat request (PDSCH-to-HARQ) timing indicator;

a one-shot HARQ-ACK request;

a beta offset indicator;

a channel state information (CSI) request; and a time domain resource allocation (TDRA).

46. The method according to claim 43, wherein the separate DCI field corresponds to a second number of information blocks, and each information block indicates control information for one of the plurality of scheduled cells.

47. The method according to claim 46, wherein the second number of information blocks are placed according to an ascending order of a serving cell index, and a first information block corresponds to a smallest serving cell index; and wherein the second number equals to the first number.

48. The method according to claim 46, wherein the control information corresponds to one of following:

a new data indicator (NDI);

a redundancy version (RV);

a modulation coding scheme (MCS); and a frequency domain resource assignment (FDRA).

49. The method according to claim 43, further comprising:

configuring each of the at least one configurable DCI field corresponding to the first number of scheduled cells in an event that the configurable DCI field is a first type; and configuring each of the at least one configurable DCI field comprising a plurality of information blocks in which each of the information blocks corresponds to the first number in an event that the configurable DCI field is a second type.

50. The method according to claim 49, wherein the configurable DCI field comprises at least one of:

a rate matching indicator;

a zero power (ZP) channel state information-reference signal (CSI-RS) trigger;

precoding information and number of layers;

a phase-tracking reference signal-demodulation reference signal (PTRS-DMRS) association;

an antenna port;

a transmission configuration indicator (TCI);

a sounding reference signal (SRS) request;

a DMRS sequence initialization;

an SRS resource indicator (SRI); and a physical reference block (PRB) bundling size indicator.

51. The method according to claim 43, further comprising:

configuring a length of information blocks in the separate DCI field or in the configurable DCI field to be the same, or configuring a length of information block in the separate DCI field or in the configurable DCI field according to at least one higher layer signaling.

52. The method according to claim 43, wherein the DCI is configured in a UE-specific search space (USS) and a length of the DCI is determined according to at least one higher layer configuration.

53. The method according to claim 43, wherein the DCI is scrambled by a cell-radio network temporary identity (C-RNTI) and a length of the DCI is not equal to a length of first DCI with a different format scrambled by the C-RNTI.

* * * * *